(12) United States Patent
McCarthy et al.

(10) Patent No.: US 12,452,441 B2
(45) Date of Patent: Oct. 21, 2025

(54) METADATA SIGNALING AND CONVERSION FOR FILM GRAIN ENCODING

(71) Applicant: Dolby Laboratories Licensing Corporation, San Francisco, CA (US)

(72) Inventors: Sean Thomas McCarthy, San Francisco, CA (US); Peng Yin, Ithaca, NY (US); Vijayakumar Gayathri Ramakrishna, Bengaluru (IN); Kishore Chamarthi, Tirupathi (IN); Kaustubh Shripad Patankar, Bengaluru (IN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/279,651

(22) PCT Filed: Mar. 31, 2022

(86) PCT No.: PCT/US2022/022958
§ 371 (c)(1),
(2) Date: Aug. 31, 2023

(87) PCT Pub. No.: WO2022/212792
PCT Pub. Date: Oct. 6, 2022

(65) Prior Publication Data
US 2024/0179330 A1    May 30, 2024

Related U.S. Application Data

(60) Provisional application No. 63/249,401, filed on Sep. 28, 2021, provisional application No. 63/210,789, filed on Jun. 15, 2021.

(30) Foreign Application Priority Data

Apr. 2, 2021   (IN) .............................. 202141015755
Jun. 30, 2021  (IN) .............................. 202141029381

(51) Int. Cl.
*H04N 19/34*   (2014.01)
*H04N 19/40*   (2014.01)
(Continued)

(52) U.S. Cl.
CPC ............. *H04N 19/34* (2014.11); *H04N 19/40* (2014.11); *H04N 19/46* (2014.11); *H04N 19/85* (2014.11)

(58) Field of Classification Search
None
See application file for complete search history.

(56) References Cited

U.S. PATENT DOCUMENTS

2006/0133686 A1* 6/2006 Gomila ............... H04N 19/176
                                                      382/254
2015/0271525 A1* 9/2015 Hendry ................ H04N 19/107
                                                      375/240.27
2022/0191501 A1* 6/2022 Guionnet ............. H04N 19/136

OTHER PUBLICATIONS

Joint Collaborative Team on Video Coding (JCT-VC) of ITU-T SG 16 WP 3 and ISO/IEC JTC 1/SC 29/VVG 11, 38th Meeting: Brussels, BE, 10—Jan. 17, 2020, Film Grain Synthesis Support in AVC and HEVC, A M. Tourapis et al. (Year: 2020).*
(Continued)

*Primary Examiner* — Xiaolan Xu

(57) ABSTRACT

Methods, systems, and bitstream syntax are described for metadata signaling and conversion for film grain encoding and synthesis. Given a bitstream with MPEG film-grain SEI messaging, for each picture, a processor: detects if the film grain model is suitable for film-grain synthesis using the AV1 autoregressive with additive blending noise model, and then: transcodes the MPEG film grain SEI parameters to corresponding AV1 film grain parameters, synthesizes the film grain, and adds it to the decoded video pictures accord-
(Continued)

ing to the AV1 specification. An example process for translating AV1 parameters to MPEG film-grain SEI messaging is also provided.

11 Claims, 10 Drawing Sheets

(51) Int. Cl.
  *H04N 19/46* (2014.01)
  *H04N 19/85* (2014.01)

(56) References Cited

OTHER PUBLICATIONS

Husak, W., et al., Supplement FGS to ITU-T H-series Recommendations—Film Grain Modelling Technologies and Metadata for Video Compression Applications (https://jvet-experts.org/doc_end_user/ documents/25_Teleconference/wgll/JVET-Y0158-v1.zip JVET-Y0158-v1 Draft TR on Film Grain Modelling Technologies and Metadata.docx).

International Telecommunication Union (ITU-T) . Aug. 2020. Series H: Audiovisual and Multimedia Systems Infrastructure of audiovisual services—Coding of moving video. Versatile supplemental enhancement information messages for coded video bitstreams. ITU-T H.274.

International Telecommunication Union (ITU-T) . Aug. 2020. Series H: Audiovisual and Multimedia Systems Infrastructure of audiovisual services—Coding of moving video. Versatile video coding. ITU-T H.266.

International Telecommunication Union (ITU-T) . Jun. 2019. Series H: Audiovisual and Multimedia Systems Infrastructure of audiovisual services—Advanced video coding for generic audiovisual services. Advanced video coding for generic audiovisual services. ITU-T H.264.

International Telecommunication Union (ITU-T). Nov. 2019. Series H: Audiovisual and Multimedia Systems Infrastructure of audiovisual services—Coding of moving video. High efficiency video coding. ITU-T H.265.

ISO/IEC 23002-7:2020(E)—Information Technology—MPEG Video Technologies—Part 7: Versatile supplemental enhancement information messages for coded video bitstreams, 2020.

Llach, J., Film Grain Technology—Specifications for H.264 | MPEG-4 AVC Bitstreams, SMPTE Registered Disclosure Document, The Society of Motion Picture and Television Engineers, Mar. 6, 2006, White Plains, NY.

Rivaz, P., et al., AV1 Bitstream & Decoding Process Specification, Version 1.0.0 with Errata 1, The Alliance for Open Media, Jan. 8, 2019.

Tourapis, A. M., Film Grain Synthesis Support in AVC and HEVC, Joint Collaborative Team on Video Coding (JCT-VC) of ITU-T SG 16 WP 3 and ISO/IEC JTC 1/SC 29/WG 11, Jan. 10-17, 2020, Brussels, Belgium.

\* cited by examiner

METADATA SIGNALING AND CONVERSION FOR FILM GRAIN ENCODING

CROSS-REFERENCE TO RELATED APPLICATIONS

This application is a U.S. National Stage application under U.S.C. 371 of International PCT Application No. PCT/US2022/22958, filed on 31 Mar. 2022, which claims priority to U.S. Provisional Application No. 63/249,401, filed Sep. 28, 2021, Indian Application No. 202141029381, filed Jun. 30, 2023, U.S. Provisional Application No. 63/210,789, filed Jun. 15, 2021, and Indian Application No. 202141015755, filed Apr. 2, 2021, all of which are incorporated herein by reference in their entireties.

The present document relates generally to images. More particularly, an embodiment of the present invention relates to metadata signaling and conversion for film grain encoding and synthesis in images and video sequences.

BACKGROUND

Film grain is typically defined as a random optical texture in processed photographic film due to the presence of small particles of a metallic silver, or dye clouds, developed from silver halide that have received enough photons. In the entertainment industry, and especially in motion pictures, film grain is considered part of the creative process and intent. Thus, while digital cameras do not generate film grain, it is not uncommon for simulated film grain to be added to captured material from digital video cameras to emulate a "film look."

Because of its random nature, film grain poses a challenge to image and video compression algorithms, since a) like random noise, it may reduce the compression efficiency of a coding algorithm used for the coding and distribution of motion pictures, and b) original film grain may be filtered and/or altered due to the lossy compression characteristics of coding algorithms, thus altering the director's creative intent. Thus, it is important when encoding motion pictures to maintain the director's intent on the film-look of a movie, but also maintain coding efficiency during compression.

To handle the film grain more efficiently, coding standards like AVC, HEVC, VVC, AV1, and the like (see Refs. [1-4]) have adopted Film Grain Technology (FGT). FGT in media workflow consists of two major components, film grain modelling and film grain synthesis. At an encoder, film grain is removed from the content, it is modelled according to a film-grain model, and the film grain model parameters are sent in the bitstream as metadata. This part allows for more efficient coding. At a decoder, film grain is simulated according to the model parameters and re-inserted back to the decoded images prior to display, thus preserving creative intent.

The term "metadata" herein relates to any auxiliary information transmitted as part of the coded bitstream and assists a decoder to render a decoded image. Such metadata may include, but are not limited to, color space or gamut information, reference display parameters, and film grain modeling parameters, as those described herein.

Film grain technology is not limited to the content which contains the true film grain. By adding artificial film grain, FGT can also be used to hide compression artifact at a decoder, which is very useful for very low bitrate applications, especially for mobile media. As appreciated by the inventors here, improved techniques for metadata signaling for film grain encoding and synthesis are described herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

FIG. TA depicts an example end-to-end flow of film grain technology when film grain may be part of the original input video.

DESCRIPTION OF EXAMPLE EMBODIMENTS

Example embodiments that relate to metadata signaling and conversion for film grain encoding are described herein. In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

SUMMARY

Example embodiments described herein relate to metadata signaling and conversion for film grain technology. In an embodiment, a processor receives an input video bitstream and associated input film grain information according to a first coding format. The processor parses the input film grain information to generate input film grain parameters for film grain synthesis in the first coding format. Next, it generates output film grain parameters for noise synthesis in a second coding format based on the input film grain parameters, wherein the second coding format is different than the first coding format. The processor generates output film noise according to the output film grain parameters and decodes the input video bitstream according to the first coding format to generate decoded video pictures. Finally, the processor adds the output film noise to the decoded video pictures to generate output video pictures.

In reference to existing coding standards, in AVC, HEVC and VVC (Refs. [1-3] and Ref. [6]) (collectively to be referred to as MPEG or MPEG video standards), film-grain model parameters are carried in a film-grain specific supplemental enhancement information (SEI) message. SEI messaging, including film-grain SEI messaging, is not normative. In SMPTE-RDD-5-2006 (Ref. [5]), the Film Grain Technology Decoder Specification, specifies bit-accurate film grain simulation. In AV1 (Ref. [4]), film-grain model parameters are carried as part of the "Film grain params syntax" section in the bitstream. Unlike the MPEG standards, film grain synthesis in AV1 is normative.

Figure 1A:
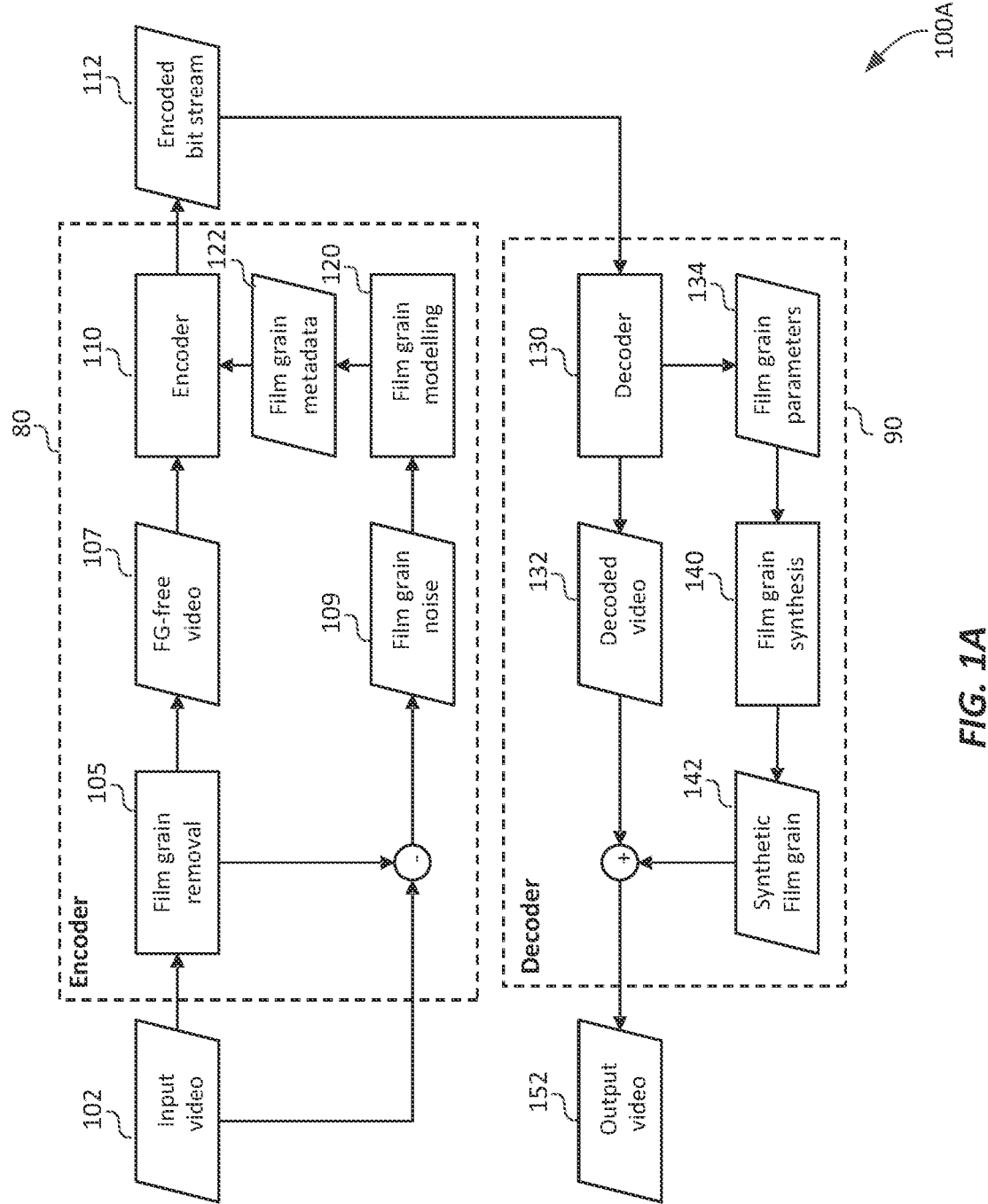
FIG. 1B depicts an example end-to-end flow of film grain technology when film grain may not be part of the original input video but is added in a decoder.

FIG. 1A depicts an example end-to-end flow (100A) of film grain technology when film grain may be part of the original input video. As depicted in FIG. 1A, during the encoding process (80), given an input video sequence (102), a film-grain-removal step (105) analyzes the video and applies denoising or other filtering techniques known in the art to reduce or remove film grain and generate a film-grain-free video (107). Subsequently, the film-grain-free video is encoded by encoder 110 (e.g., using AVC, HEVC, AV1, and the like). In parallel, an estimate of the film grain noise (109) (e.g., as extracted by the input video 102) is processed by film grain modeling process 120 to generate parameters which according to a film-grain model can be used by the decoding process (90) to reproduce a close approximation of the original film grain. These parameters are embedded as metadata (122) in the encoded bitstream (112). The metadata can be part of the bitstream syntax or part of supplemental information (e.g., SEI messaging and the like).

During the decoding process (90), a video decoder (130) (e.g., an AVC, HEVC, AV1, and the like decoder) receives the coded bitstream (112) and the corresponding film-grain metadata (122), to generate a decoded video bitstream (132) and FG parameters (134), typically the same as the parameters generated in step 120 in the encoding process. A film-grain synthesis process 140 applies those FG parameters to generate synthetic film grain (142), which, when added to the decoded video film-grain-free video (132), generates the output video (152), which is a close approximation of the input video (102).

Figure 1B:
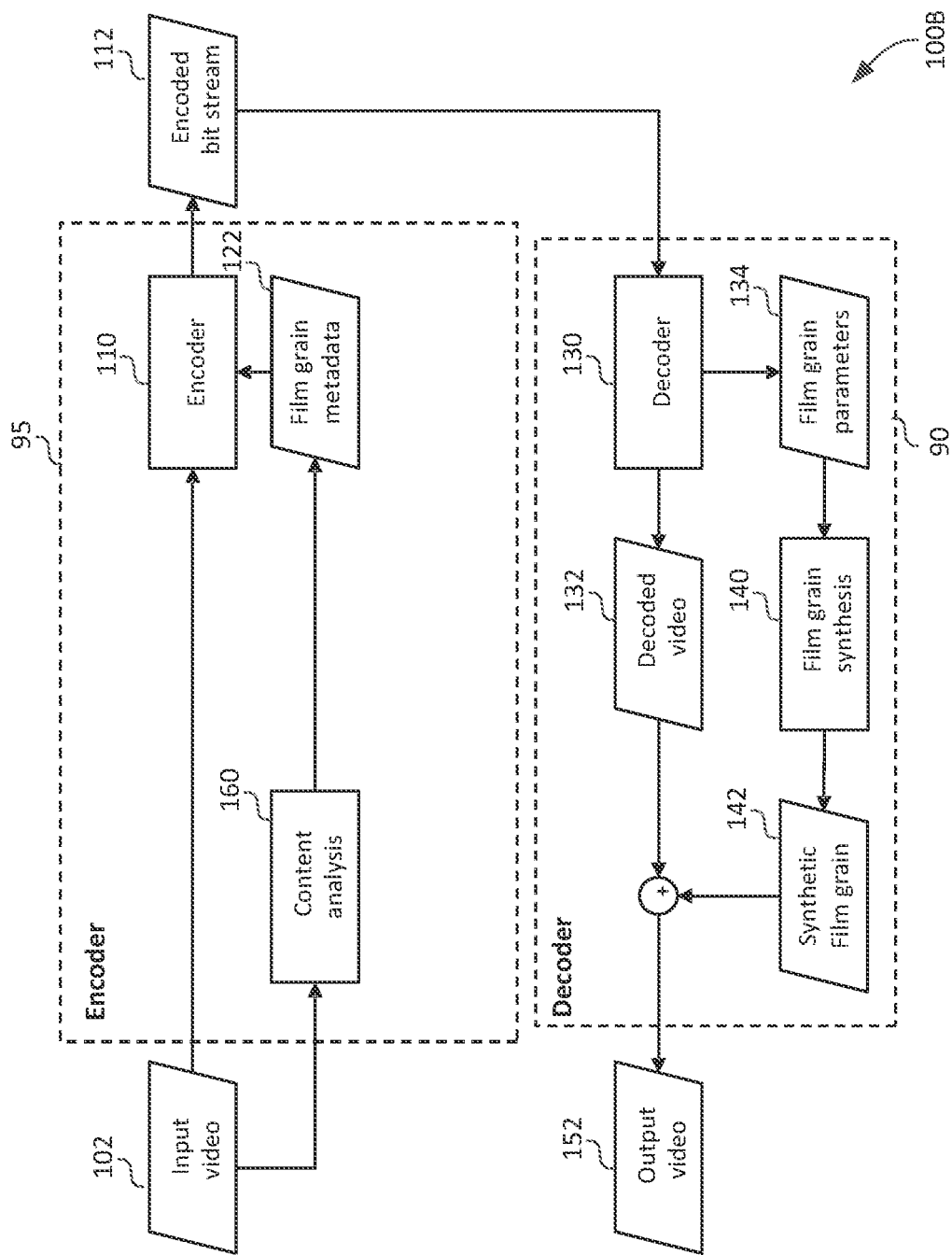

FIG. 1B depicts an example end-to-end flow (100B) of film grain technology when film grain may not be part of the original input video, but it may be added during the decoding process. As depicted in FIG. 1B, during encoding (95), given an input video sequence (102), which may be free of film grain, a content analysis step (160) may take into consideration the input characteristics and the encoder (110) coding characteristics to decide on what type of synthetic film-grain noise, when added on the decoded video, may improve video quality or emulate a "film look." The output of this analysis is a set of film-grain model parameters which can be embedded into the coding bitstream (112) as metadata (122). These metadata can be part of the bitstream syntax or part of supplemental information (e.g., SEI messaging and the like).

The decoding process (90) in process 100B is identical to the one as in process 100A. After decoding the coded bitstream (112), a film-grain synthesis process (140) applies the extracted FG parameters to generate synthetic film grain (142), which, when added to the decoded film-grain-free video (132) generates the output video 152, which is a close approximation of the input video (102).

MPEG Film Grain Metadata

In AVC, HEVC, and VVC (Refs. [1-3] and Ref. [6]), collectively, for ease of discussion, to be referred to as MPEG or as MPEG video, the film grain model parameters are part of the syntax related to film grain characteristics (FGC) or film-grain (FG) SEI messaging. Film Grain Synthesis (FGS) is primarily characterized by the following set of parameters:

A film grain model: comprising a frequency filtering model or an auto-regression (AR) model Blending mode: comprising an additive mode or a multiplicative mode Intensity intervals: comprising lower and upper bounds for each of the intervals Component model values: syntax parameters which define the characteristics of the method used in a particular grain model As an example, Table 1 captures some of the key parameters supported in FGC SEI for AVC. In VVC SEI (Ref. [6]), these parameters may be referred to with slightly different names, e.g., fg_model_id, fg_separate_colour_description_present_flag, fg_blending_mode_id, and the like.

TABLE 1

Film Grain Characteristic in MPEG SEI parameters

| Parameter | bits used | Range | Significance |
| --- | --- | --- | --- |
| film_grain_model_id | 2 | 0, 1 | Model to be used in grain synthesis. 0: Frequency filtering, 1: Auto-regression |
| separate_colour_description_present_flag | 1 | 0, 1 | Defines whether color description for the film grain specified is same as for the coded video sequence. |
| blending_mode_id | 2 | 0, 1 | Blending mode used to combine grain and decoded samples. 0: Additive, 1: Multiplicative |

TABLE 1-continued

Film Grain Characteristic in MPEG SEI parameters

| Parameter | bits used | Range | Significance |
|---|---|---|---|
| comp_model_present_flag | 1 | 0, 1 | Defines the presence of modelling of film grain on each color component |
| num_intensity_intervals_minus1 | 8 | 0-255 | Defines the number of intensity intervals for each color component |
| num_model_values_minus1 | 3 | 0-5 | Specifies the number of component model values available in the SEI (default values will be used for the remaining component model values) |
| intensity_interval_lower_bound | 8 | | Lower bound for each of intensity intervals for which the model is applicable |
| intensity_interval_upper_bound | 8 | | Upper bound for each of intensity intervals for which the model is applicable |
| comp_model_value | se(v) | Range_0 Range_1 | Component model values has different meaning depending on the value of film grain model used. |
| film_grain_characteristics_repetition_period | ue(v) | 0-16384 | Defines the persistence of the FGC SEI message in the bit stream. | where
Range 0: [0, limit_model 0] for film_grain_model_id=0;
Range_1: [−limit_model_1, limitmodel1−1] for film_grain_model_id=1;
with limit_model $0=2^{(filmGrainBitDepth[c])}-1$ and
 limit_model $1=2^{(filmGrainBitDepth[c]-1)}$.
Note: for HEVC and VVC, film_grain_characteristics_repetition_period is replaced by fg_characteristics_persistence_flag which uses u(1) encoding (unsigned integer of 1 bit).

MPEG video SEI messaging supports two models: a frequency filtering model and an auto-regression (AR) model. No bit-accurate FG synthesis process has been specified in the AVC, HEVC and VVC specifications. For the frequency filtering model, the SMPTE-RDD-5-2006 document (to also be referred as RDD-5) "Film Grain Technology—Specifications for H.264| MPEG-4 AVC Bit streams" (Ref. [5]) specifies a bit-accurate process for film grain simulation. Table 2 depicts the FGC parameters being used in Ref. [5] and their supported range.

TABLE 2

Film grain characteristic constraints in SMPTE RDD-5

| Parameter | Supported value / Range |
|---|---|
| film_grain_model_id | 0 (frequency filtering) |
| separate_colour_description_present_flag | 0 |
| blending_mode_id | 0 |
| log2_scale_factor | 2-7 |
| num_model_values_minus1[ c ] | 0-2 |
| comp_model_value[ c ][ i ][ 0 ] | 0-255 |
| comp_model_value[ c ][ i ][ 1 ] and | 2-14 |
| comp_model_value[ c ][ i ][ 2 ] | |
| film_grain_characteristics_repetition_period | 0 |

FGC parameters are additionally constrained when used in Ref. [5], as follows:
 intensity_interval_lower_bound[c][i] and intensity_interval_upper_bound[c][i]. For all c and for any intensity value v, there shall be at most one intensity interval i that verifies intensity_interval_lower bound[c][i]<=v and intensity interval upper bound[c][i]>=v
Combining all the color components c and intensity intervals i in an SEI message, the number of different pairs (comp_model_value[c][i][1], comp_model_value [c][i][2]) shall be equal or smaller than 10.
The film grain simulation method shall only be used on progressive content
These constraints are interpreted as follows:
The film synthesis method is applied only on progressive content.
The film grain model uses frequency filtering with additive blending mode
The process restricts the value num_model_values_minus1[c] to a max of 2, which does not allow band-pass filtering and cross-color correlation.
Multi-generational film grain is not supported. The intensity intervals do not overlap thus only one intensity interval is allowed for each sample (the interval is determined from the average at 8×8 block level).
For all color components c and intensity intervals i in an SEI message, the number of different pairs (comp_model_value[c][i][1], comp_model_value[c][i][2]) should be less than or equal to 10.
Successive IDR frames shall not have the same idr_pic_id and any two IDR frames which are 32 or fewer frames apart (in decoding order) shall not have the same idr_pic_id.
Film grain simulation shall be performed on the decoded frame, before applying cropping.
The simulation process is defined for 4:2:0 chroma format, 8-bit depth.
Note: recent updates to AVC, HEVC, and VVC specifications extended FGC to support bit depth larger than 8 bits. In principle, the same procedure could be applied to RDD-5 as well.
The film grain synthesis in RDD-5 contains two major steps:
 Creation of a film grain pattern data base
 Film grain simulation A database for all combinations of horizontal and vertical cut frequencies h and v in range 0 to 12 (total of 169 patterns) is created using a look up table and pseudo-random values.

For all 8×8 blocks in each color component, the block average is computed and compared with intensity intervals to select the film grain component values to be used for the 8×8 block. If the average does not fall into any bounds, then no simulation will be performed.

A 3-tap deblocking filter is applied to the vertical boundaries of 8×8 blocks to reduce the degree of visible blocks.

AV1 Film Grain Technology

Film grain synthesis in AV1 is a normative process and uses an auto regression (AR) model for the simulation of noise and an additive blend mode for adding the noise to the decoded source samples. The synthesis process is primarily controlled by grain pattern and grain intensity.

AV1 determines the FG process in the following steps: a) a random number generation process, b) a grain generation process, c) a scaling lookup initialization process, and d) an adding noise synthesis process.

Comparing the two film grain synthesis models, MPEG video SEI supports the AR film model by setting film_grain_model_id to 1 and supports additive blend mode by setting blending_mode_id to 0. The major FGS differences between the MPEG video SEI AR model and the AV1 AR model are as follows:

The MPEG video SEI AR model works at the frame level with dependencies on previous synthesized grains. The AV1 AR model use stripes, which are 32×W size which are formed from Luma grain of size 82×73.

The MPEG video SEI AR model can use higher number of neighbours compared to AV1

For chroma grain dependency on Luma,
  a. For the MPEG video SEI AR model, chroma grain synthesis can be dependent on luma and chroma, which are controlled by component model value
  b. For the AV1 FGS model, grain synthesis is independent. Blending of noise on chroma can have dependency on the intensity of decoded luminance Transcoding of Film-Grain Metadata Given that decoding devices may have already hardware accelerators to enable film-grain synthesis for either AV1 or MPEG video content (e.g., AVC, HEVC, and VVC), and given that film grain metadata may be generated regardless of the video coding technology, as appreciated by the inventors, transcoding between MPEG and AV1 film-grain metadata may allow users a richer user experience, using existing content. Furthermore, proposed embodiments allow the existing MPEG film-grain (FG) SEI messaging syntax to be used as is to allow decoders to apply the AV1 film-grain synthesis on MPEG-decoded video.

MPEG to AV1 Conversion of Film Grain Parameters

Figure 2:
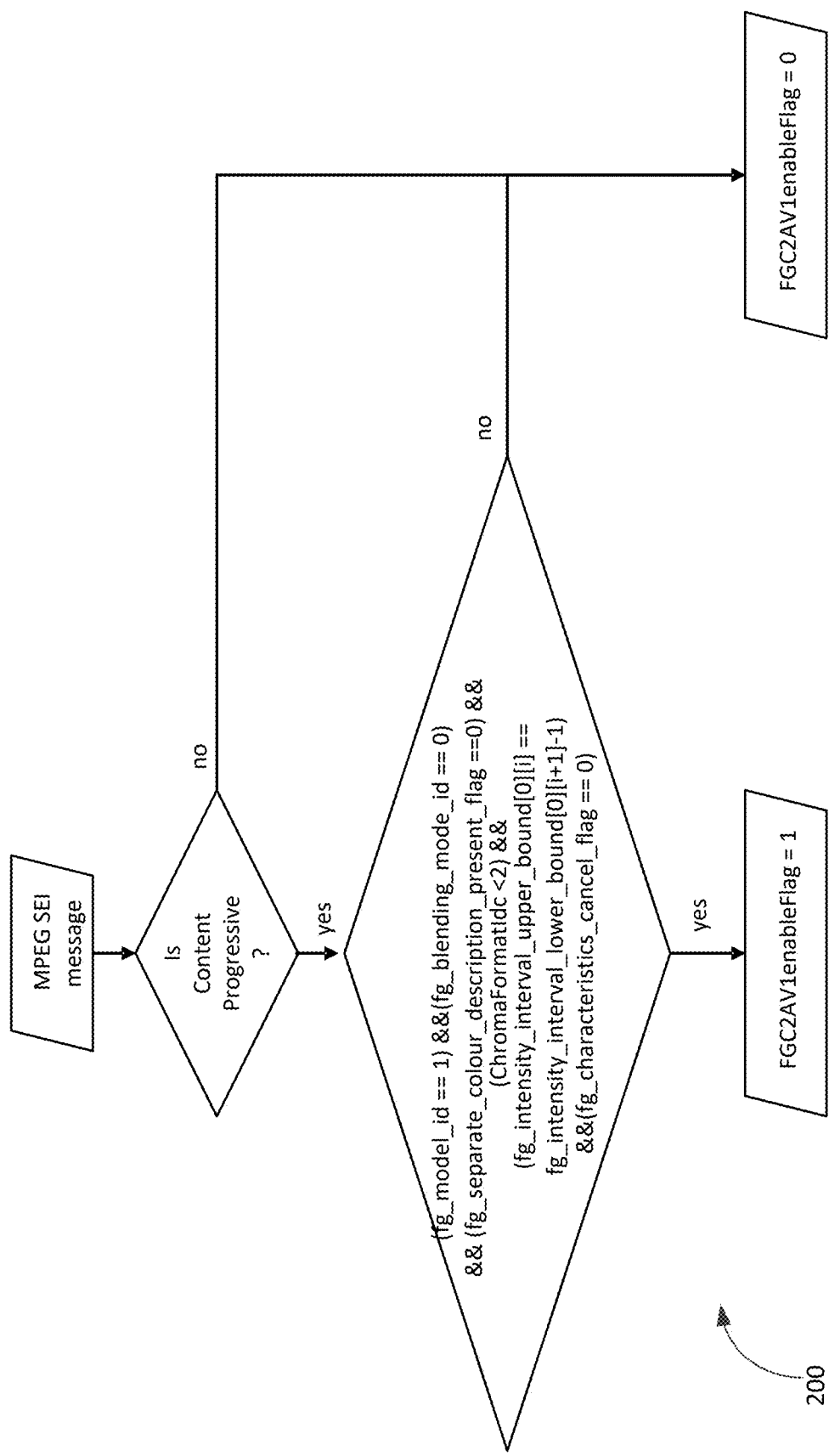
FIG. 2 depicts an example of a process flow to determine if syntax values contained in an MPEG film-grain SEI message may be applied in an AV1 film grain synthesis process.

FIG. 2 depicts an example of a process flow (200) to determine if syntax values contained in an MPEG SEI message may be applied in an AV1 film grain synthesis process. In an embodiment, when all of the following constraints apply, the variable FGC2AV1enableFlag shall be set equal to 1, indicating that MPEG SEI messaging can be used to generate film grain noise according to the AV1 specification, otherwise FGC2AV1enableFlag shall be set to 0:

fg_model_id shall equal 1 (autoregressive).
fg_blending_mode_id shall equal 0 (additive).
fg_separate_colour_description_present_flag shall equal 0.
ChromaFormatIdc shall be less than 2 (monochrome or YUV 4:2:0 only).
The value of fg_intensity_interval upper bound[0][i] shall be equal to fg_intensity_interval_lower_bound[0][i+1]−1 and the value of fg_intensity_interval_lower_bound[0][i+1] shall be equal to fg_intensity_interval upper bound[0][i]+1, which is consistent with representation of intensity intervals using a piecewise continuous model. (Note that this constraint also disallows multi-generational film grain synthesis)

Note: As described in Ref. [6], fg_intensity_interval_lower_bound [c][i] specifies the lower bound of the i-th intensity interval for which the set of model values applies, fg_intensity_interval_upper_bound[c][i] specifies the upper bound of the i-th intensity interval for which the set of model values applies, where c denotes a color component, where c equal to 0 refers to the luma component, c equal to 1 refers to the Cb component, and c equal to 2 refers to the Cr component.

fg_characteristics_cancel_flag=0; assuming there is no persistence from prior FG messaging, the flag indicates that new FG parameters are present The content for which the MPEG SEI applies is progressive.

When FGC2AV1enableFlag is equal to 1, the syntax values contained in the MPEG SEI message may be used in an AV1 film grain synthesis process. When FGC2AV1enableFlag is equal to 0 the syntax values contained in the MPEG SEI message should not be used in an AV1 film grain synthesis process.

Figure 3:
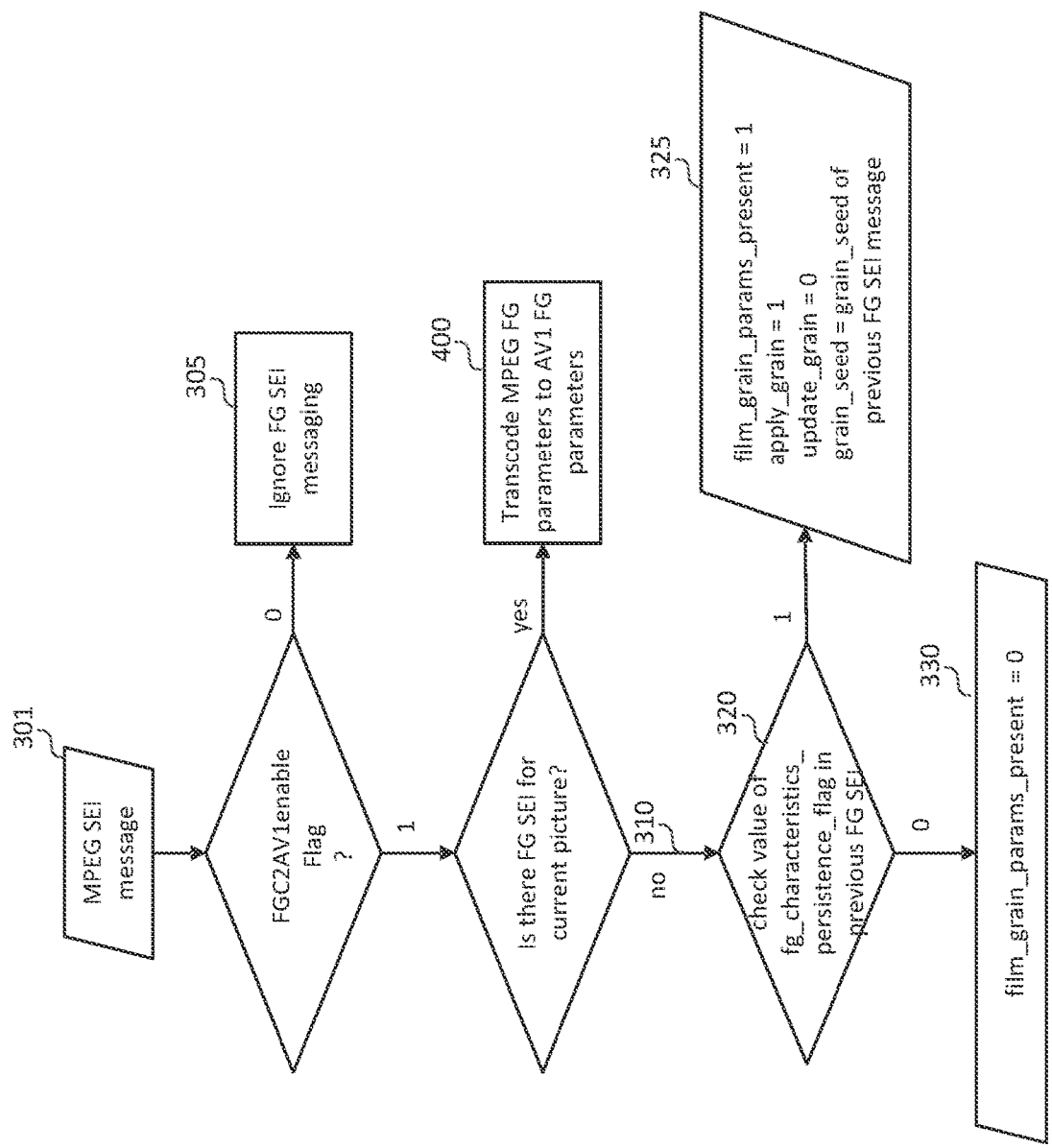
FIG. 3 depicts an example of a process flow to determine if an MPEG film-grain SEI message should be ignored or transcoded for use in an AV1 film grain synthesis process.

FIG. 3 depicts an example of a process flow to determine if an MPEG SEI message related to film grain should be ignored or transcoded for use in an AV1 film grain process. If, as depicted in FIG. 2, it is determined that FGC2AV1enableFlag=0, then (step 305), the decoder will not apply any AV1 film synthesis and may apply film-grain according to the MPEG video specification. When FGC2AV1enableFlag is equal to 1 and the MPEG SEI message is intended to be used in an AV1 film grain synthesis process, in an embodiment, the following constraints may apply for the values of the AV1 film grain params syntax elements:

1) if MPEG FG SEI for the current picture is not present (path 310),
   (step 320) if fg_characteristics_persistence flag in previous MPEG SEI is equal to 1, then (step 325): film grain_params_present shall be equal to 1, apply_grain shall be equal to 1, update_grain shall be equal to 0, grain_seed shall be set to the same value of the previous MPEG FG SEI.
   Otherwise (330) (if fg_characteristics_persistence_flag in a previous MPEG SEI is equal to 0), film_grain_params_present shall be equal to 0

Figure 4:
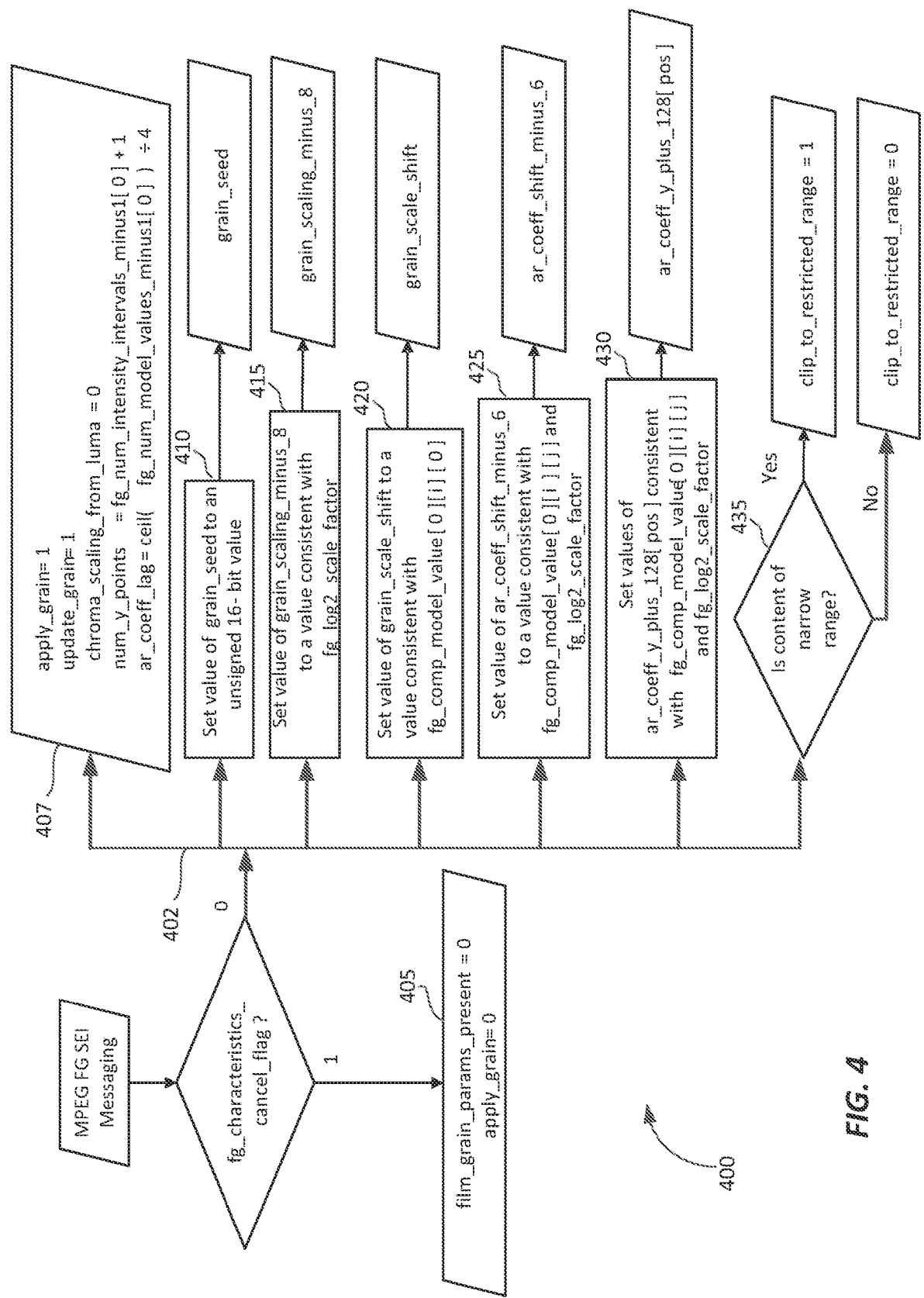
FIG. 4 depicts an example of a process flow to transcode an MPEG SEI message for use in an AV1 film grain process.

2) otherwise (if MPEG FG SEI for current picture is present), then, in step 400, the MPEF FG SEI parameters may be transcoded to AV1 FG parameters as follows (see also FIG. 4):
   When fg_characteristics_cancel_flag is equal to 1, then (405): the film grain_params_present flag shall be equal to 0 and apply_grain shall be equal to 0 else (402), if fg_characteristics_cancel_flag is equal to 0, then
   (407) apply_grain shall be equal to 1 and update_grain shall be equal to 1.
   (407) num_y_points shall be equal to a value consistent with fg_num_intensity intervals_minus1[0]+1 (i.e., the number of points in the piecewise continuous model shall be sufficient to support fg_intensity_interval_lower_bound[0][i] and fg_intensity interval upper bound[0][i])
   (407) chroma_scaling_from_luma shall be equal to 0 and ar_coeff lag=ceil(fg_num_model_values_minus1[0]+4)
   (410) grain_seed shall be set to an unsigned 16-bit value. In one embodiment, grain_seed value can be set as in the section "1.5.2.1 Seed initialization" in SMPTE RDD-5 for the luma component.

(415) grain_scaling_minus_8 shall be equal to a value consistent with fg_log 2_scale_factor. For example, in an embodiment, fg_log 2_scale_factor=grain_scaling_minus_8+8.

Thus, given the two MPEG SEI flags: fg_characteristics_cancel_flag and fg_characteristics_persistence_flag, the following data flow in pseudo code summarizes the proposed actions according to an embodiment:

```
if film-grain SEI messaging is present {
    if (fg_characteristics_cancel_flag = = 0), then proceed with FG process;
    else  {
            fg_characteristics_persistence_flag = 0;
            there is no film-grain process;
        }
}
else
    { if (fg_characteristics_persistence_flag = =1),
            then proceed with FG process;
        else there is no film-grain process;
    }
```

In addition, one can set the overlap flag equal to 0 or 1, to either disallow or allow spatial overlapping between film grain blocks. Because this value is signaled in the bitstream in AV1, unless it can also be signaled through the MPEG FG SEI messaging, for improved video quality, a default value of 1 is suggested. The AR model parameters can be mapped in a variety of ways. In one embodiment, the mapping may be indicated as follows:

a) Using ar_coeff lag=ceil(fg num_model_values_minus1 [0]+4), the value of ar_coeff lag parameter may be as indicated as in Table 3.

TABLE 3 ar_coeff_lag values derived from fg_num_model_values_minus1[0]

| fg_num_model_values_minus1[ 0 ] | ar_coeff_lag |
| --- | --- |
| 0 | 0 |
| 1 | 1 |
| 2 | 1 |
| 3 | 1 |
| 4 | 1 |
| 5 | 2 | b) (430) The value of ar coeff_y_plus_128[pos] shall be as indicated in Table 4, when ar_coeff lag is equal to 1, and Table 5, when ar_coeff lag is equal to 2.

TABLE 4 ar_coeff_y_plus_128[ pos ] derived from fg_comp_model_value[ 0 ][ i ][ j ] when ar_coeff_lag is equal to 1

| pos | ar_coeff_y_plus_128[ pos ] |
| --- | --- |
| 0 | (fg_comp_model_value[ 0 ][ i ][ 3 ] * fg_comp_model_value[ 0 ][ i ][ 4 ]) >> fg_log2_scale_factor + 128 |
| 1 | (fg_comp_model_value[ 0 ][ i ][ 1 ] * fg_comp_model_value[ 0 ][ i ][ 4 ]) >> fg_log2_scale_factor + 128 |
| 2 | fg_comp_model_value[ 0 ][ i ][ 3 ] + 128 |
| 3 | fg_comp_model_value[ 0 ][ i ][ 1 ] + 128 |

TABLE 5 ar_coeff_y_plus_128[ pos ] derived from fg_comp_model_value[ 0 ][ i ][ j ] when ar_coeff_lag is equal to 2

| pos | ar_coeff_y_plus_128[ pos ] |
| --- | --- |
| 0 | 128 |
| 1 | 128 |
| 2 | (fg_comp_model_value[ 0 ][ i ][ 5 ] * fg_comp_model value[ 0 ][ i ][ 4 ] * fg_comp_model_value[ 0 ][ i ][ 4 ]) >> (2*fg_log2_scale_factor) + 128 |
| 3 | 128 |
| 4 | 128 |
| 5 | 128 |
| 6 | (fg_comp_model_value[ 0 ][ i ][ 3 ] * fg_comp_model_value[ 0 ][ i ][ 4 ]) >> fg_log2_scale_factor + 128 |
| 7 | (fg_comp_model_value[ 0 ][ i ][ 1 ] * fg_comp_model_value[ 0 ][ i ][ 4 ]) >> fg_log2_scale_factor + 128 |
| 8 | fg_comp_model_value[ 0 ][ i ][ 3 ] + 128 |
| 9 | 128 |
| 10 | fg_comp_model_value[ 0 ][ i ][ 5 ] + 128 |
| 11 | fg_comp_model_value[ 0 ][ i ][ 1 ] + 128 | c) (425) ar_coeff_shift_minus_6 shall be equal to a value consistent with the range for autoregressive coefficients indicated by fg_comp_model_value[0][i][j] and fg_log 2_scale_factor.

d) (420) grain_scale_shift shall be equal to a value consistent with fg_comp_model_value[0][i][0]

e) set overlap flag to 0 or 1 (1 should provide better quality)

f) (435) when film grain is applied to narrow range content, clip to_restricted range should be equal to 1, otherwise it to should be set to 0.

Figure 5A:
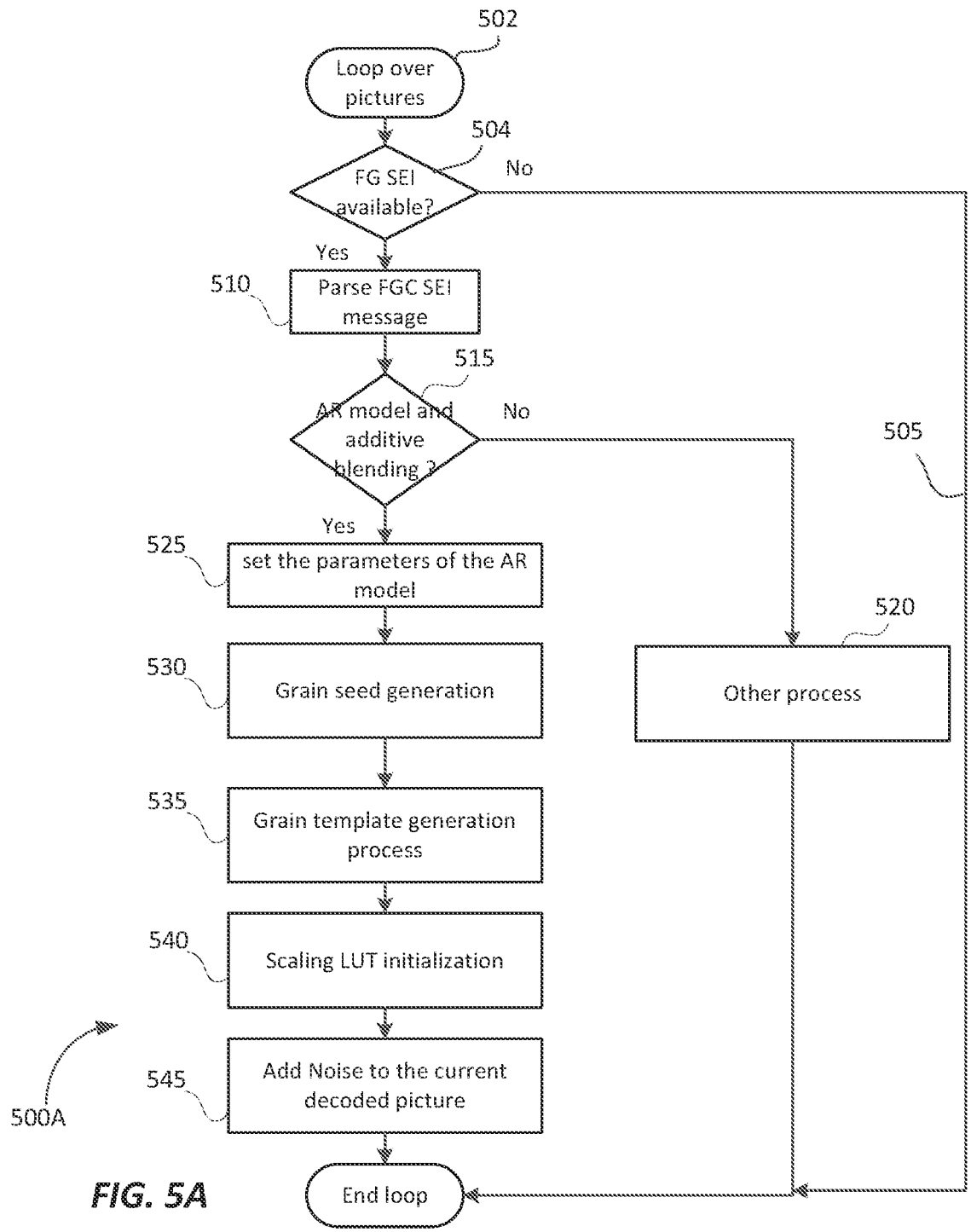
FIG. 5A and FIG. 5B depict example processes for film grain synthesis using MPEG SEI messaging and AV1 film grain synthesis.

FIG. 5A depicts an alternative example process (500A) for film grain synthesis using MPEG SEI messaging and AV1 film grain synthesis. Given a sequence of pictures (502), in step 504, a decoder may check whether the current picture has associated film-gram (FG) SEI messaging. If there is no such messaging, then (path 505), ignoring for now the status of any persistence flags, there is no film grain to be added and the decoder moves to the next picture. Otherwise, the decoder moves to step 510 to parse the MPEG SEI messaging.

In step 515, the decoder needs to decide whether the provided SEI messaging can be used to perform FG synthesis using AV1 film synthesis, and in particular, using the AR, additive, model. For example, process 200 (in FIG. 2) may be used to detect whether the value of FGC2AV1enableFlag=1. If the model being used is different, then parsing and transcoding of the MPEG FG SEI parameters is done through "other process" (520) which is outside the scope of the current disclosure. For example, in one embodiment, process 520 may simply be "do nothing" or "apply the MPEG film-grain synthesis" process.

Next, in step 525, one needs to set up the parameters for the AV1 AR model, such as the value of shifts, the AR coefficients, and the like. For the shift operation, AV1 has three related parameters: grain_scaling_minus_8, ar_coeff_shift_minus_6 and grain_scale_shift. In MPEG FG, there is only one parameter fg_log 2_scale_factor (in AVC, also referred to as log 2_scale_factor). In an embodiment, fg_log 2_scale_factor is set equal to grain_scaling_minus_8+8, grain_scale_shift is set equal to 0, and ar_coeff_shift_minus_6 is set to a constant value among (0, 1, 2, 3). For example, one can set ar_coeff_shift_minus_6 equal to 2.

For the MPEG AR model parameters, fg_comp_model_value[c][i][0] models the variance or standard deviation of film grain noise. In an embodiment, one can use it to generate the ScalingLUT table or map to point_y/cb/cr values, described in step 540. The ScalingLUT is generated by having the constant value within an intensity interval instead of linear interpolation. ScalingLUT is generated as follows: The variable NumPoints[cIdx] for cIdx=0 . . . 2 is set as following:
- if fg_comp_model_present_flag[cIdx] is equal to 0, NumPoints[cIdx] is set to 0.
- Otherwise (fg_comp_model_present_flag [cIdx] is not equal to 0), NumPoints[cIdx] is set to equal to fg_num_intensity_intervals_minus1[cIdx]+1.

AV1 syntax num_y_points is set equal to NumPoints[0], AV1 syntax num_cb_points is set equal to NumPoints[1], and AV1 syntax num_cr_points is set equal to NumPoints[2].

```
if ( NumPoints[ cIdx ] == 0 ) {
    for ( x = 0; x < 256; x++ )
        ScalingLut[cIdx][ x ] = 0
} else {
    for ( x = 0; x < fg_intensity_interval_lower_bound[ c ][ 0 ] [ 0 ]; x++ )
        ScalingLut[cIdx][ x ] = 0
    for ( i = 0; i <= fg_num_intensity_intervals_minus1[ c ]; i++ ) {
        dX = fg_intensity_interval_upper_bound[ cdx ][ i ] –
fg_intensity_interval_lower_bound[ cIdx ][ i ]
        for ( x = 0; x < dX; x++ )
            ScalingLut[cIdx][ fg_intensity_interval_lower_bound[ cIdx ] [ i ] + x ]
=        fg_comp_model_value[ c ][ i ][ 0 ]
    }
    for ( x =
fg_intensity_interval_upper_bound[ cIdx ][ fg_num_intensity_intervals_minus 1[ c ] ]; x <
256; x++ )
        ScalingLut[cIdx][ x ] = 0
}
```

To obtain values of the scaling function, the following procedure is invoked with the color plane index cIdx and the input value pointVal as inputs. The output is the value of the scaling function pointScal.

```
scaleLut(cIdx, pointVal) {
    if ( BitDepth == 8)
```

```
        pointScal = ScalingLut[cIdx][ pointVal ]
    else
        x = Clip3( 0, 255,
            ( pointVal + ( 1 << ( BitDepth – 9 ) ) ) >> ( BitDepth[c] – 8 )
        )
        pointScal = ScalingLut[cIdx][x]
```

When ar_coeff lag is set equal to 2, fg_comp_model_value[c][i][j], j=1, 2, 3, 4, 5, are set as follows:
- fg_comp_model_value[c][i][2] shall be equal to 0 for c=0 . . . 2 and i=0 . . . fg_num_intensity_intervals_minus1[c]
- fg_comp_model_value[c][i][1] shall be equal to an ar (AR) value, denoted as ar_value1[c], for c=0 . . . 2 and i=0 . . . fg_num_intensity_intervals_minus1[c]
- fg_comp_model_value[c][i][3] shall be equal to an ar value, denoted as ar_value3[c], for c=0 . . . 2 and i=0 . . . fg_num_intensity_intervals_minus1[c]
- fg_comp_model_value[c][i][4] shall be equal to an ar value, denoted as ar_value4[c], for c=0 . . . 2 and i=0 . . . fg_num_intensity_intervals_minus1[c]
- fg_comp_model_value[c][i][5] shall be equal to an ar value, denoted as ar_value5[c], for c=0 . . . 2 and i=0 . . . fg_num_intensity_intervals_minus1[c]

The Variable numPos[cIdx] is Set as the Follows:
- If cIdx=0, numPos[cIdx]=2*ar_coeff lag*(ar_coeff_lag+1)
- Otherwise (cIdx !=0), numPos[cIdx]=numPos[0]+1

The array aRCoeffs[cIdx][pos], for pos=0 . . . numPos[cIdx]−1 is set equal to 0, except the following.
- aRCoeffs[cIdx][2] is set equal to (((ar_value5[cIdx] *ar_value4[cIdx] *ar_value4[cIdx])«aRCoeffShift)+ (1«(ScalingShift+1))»(3*ScalingShift)
- aRCoeffs[cIdx][6] is set equal to (((ar_value3[cIdx] *ar_value4[cIdx])«aRCoeffShift)+(1 «ScalingShift))» (2*ScalingShift)
- aRCoeffs[cIdx][7] is set equal to (((ar_value1[cIdx] *ar_value4[cIdx])«aRCoeffShift)+(1 «ScalingShift))» (2*ScalingShift)

- aRCoeffs[cIdx][8] is set equal to ((ar_value3[cIdx]«aRCoeffShift)+(1 «(ScalingShift-1)))»ScalingShift
- aRCoeffs[cIdx][10] is set equal to ((ar value5[cIdx]«aRCoeffShift)+(1 «(ScalingShift-1)))»ScalingShift
- aRCoeffs[cIdx][11] is set equal to ((ar value1[cIdx]«aRCoeffShift)+(1 «(ScalingShift-1)))»ScalingShift The aRCoeffs are used to generate grain template in step 535.

In AV1, the variable grain seed (also to be referred to as GrainSeed) specifies the starting value for the pseudo-random number generator used in film grain synthesis. In particular, GrainSeed contains the value used to initialize a 16-bit variable RandomRegister. Without limitation, the GrainSeed generation step (530) may follows section "1.5.2.1 Seed initialization" in SMPTE RDD-5 for the luma component. An example implementation is also provided in "Section 8.5.3.2" in Appendix 1.

In SMPTE RDD-5, the seed is generated based on the variables PicOrderCnt and idr_pic_id for IDR frame (frames that can be decoded without reference to other frames). In AVC, idr_pic_id can be read from the slice header, and successive IDR frames should not have the same idr_pic_id. Additionally, any two IDR frames that are 32 or fewer frames apart (in decoding order) should not have the same idr_pic_id. This is to avoid film grain repetition in temporally-adjacent frames. However, this syntax does not exist in HEVC or VVC. In an embodiment, one may define a new "idr_pic_id"-like variable (herein named for convenience and with no limitation idr_pic_id), which can be updated by setting idr_pic_id=0 initially and increasing idr_pic_id by 1 for every IRAP picture. A potential shortcoming of this approach is that for trick modes (e.g., fast forwarding and the like) such an idrpic_id variable will lose proper synchronization and may have invalid values. In another embodiment, it is proposed not to use the idr_pic_id information. For example, it is suggested to put constraints to the PicOrderCnt value. For example, PicOrderCnt value can have the following constraints: 1) successive IRAP frames shall not have the same PicOrderCnt value, and 2) any two IRAP frames which are 32 or fewer frames apart (in decoding order) shall not have the same PicOrderCnt value. This approach could be applied to future revisions of SMPTE-RDD-5 to support HEVC and VVC.

The film grain synthesis process can be described as follows. Given AR coefficients and a Gaussian sequence, a film grain template is generated first (530). With a pseudo-random generator, the decoder generates offsets for a 32×32 block (or +2 additional row/columns when overlap is used) inside the film grain template. The pseudo-random generator is initialized in the beginning of each row of 32×32 blocks to allow parallel row processing. The generator is initialized based on a GrainSeed element. The 32×32 block of the film grain is scaled, and added to the reconstructed samples, and then clipping is applied (545). For 4:2:0, the block size for chroma components is half of the luma block size horizontally and vertically. For more details, one is referred to the proposed example operations provided in Appendix 1 in "Section 8.5.3.3."

Following step 535, as in AV1, the process continues with initializing a scaling look-up table (LUT) in step 540 and adding the noise to the current decoded picture (step 545).

In summary, the process of applying AV1 FGS process using the MPEG SEI AR model is as follows:

At the encoder, develop the model and appropriate syntax to transmit using the MPEG video SEI messaging for film grain synthesis.

At the decoder, map the MPEG FG SEI parameters to corresponding AV1 FG parameters, and follow the proposed film-grain synthesis process (500)

Figure 5B:
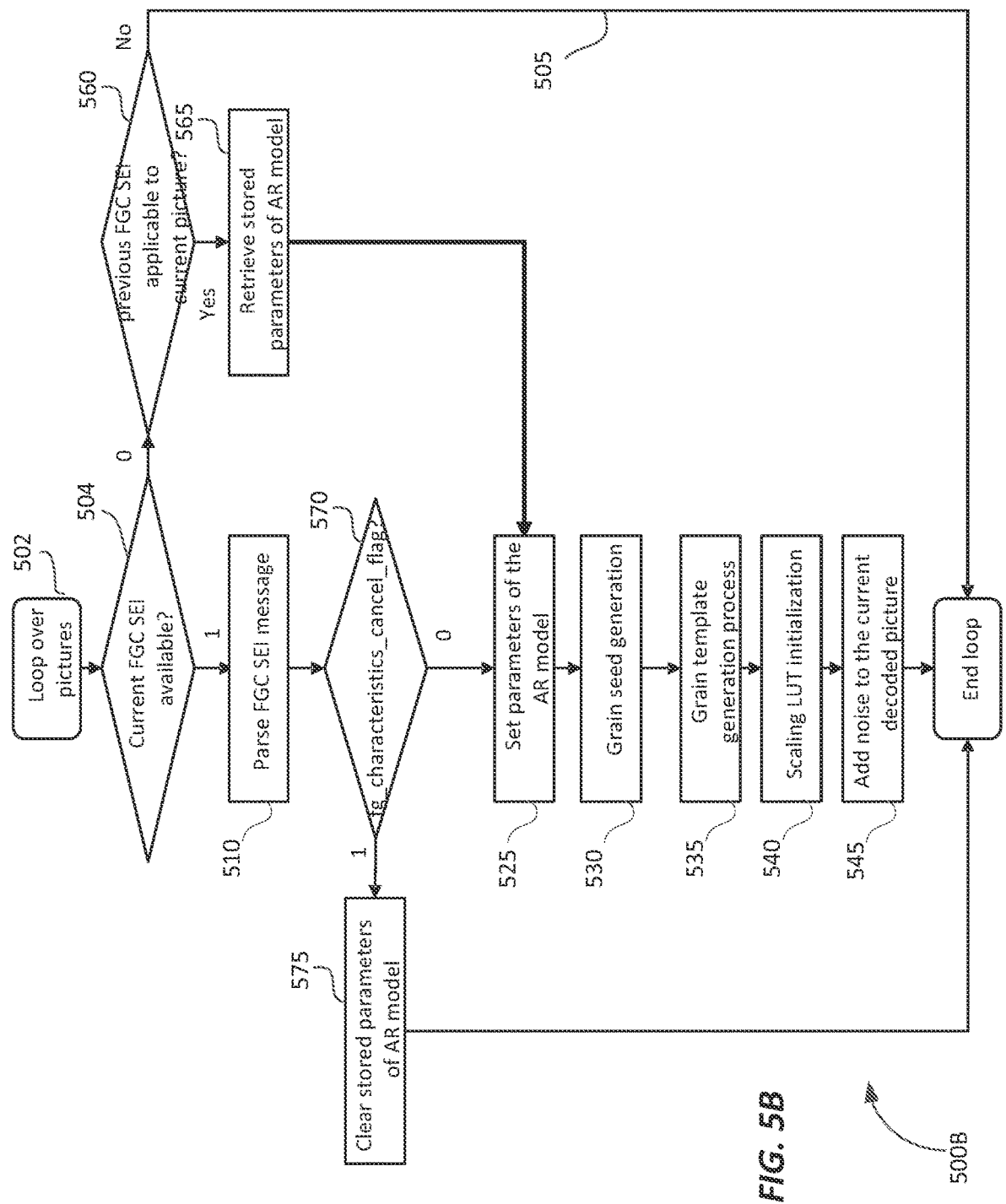

FIG. 5B depicts an alternative example process (500B) for film grain synthesis using MPEG SEI messaging and AV1 film grain synthesis. Compared to process 500A, both have identical film-noise synthesis and film-noise addition steps 525, 530, 535, 540, and 545, as described earlier. Assuming AR modeling with additive blending is enabled, process 500B provides some additional processing details on how the computed AR parameters can be updated as needed. For example, after step 504, if there is no FG SEI messaging, process 500B includes two additional steps: 560 and 565. In step 560, a decoder may check whether film-grain processing was previously available (e.g., by checking the FG persistence flag). If no such processing was available, process follows path 505 as before. If yes, then in step 565 the decoder may retrieve the previously generated AV1 film-grain parameters and move to step 525.

Process 500B includes also the additional steps 570 and 575. In step 570, the decoder checks the value of fg_characteristics_cancel_flag. If it is set to zero, then the remaining FG SEI message is parsed and new film-synthesis parameters are generated to proceed with step 525. Otherwise, in step 575, the stored AR parameters are cleared and the film-grain synthesis and addition process is skipped.

Figure 6A:
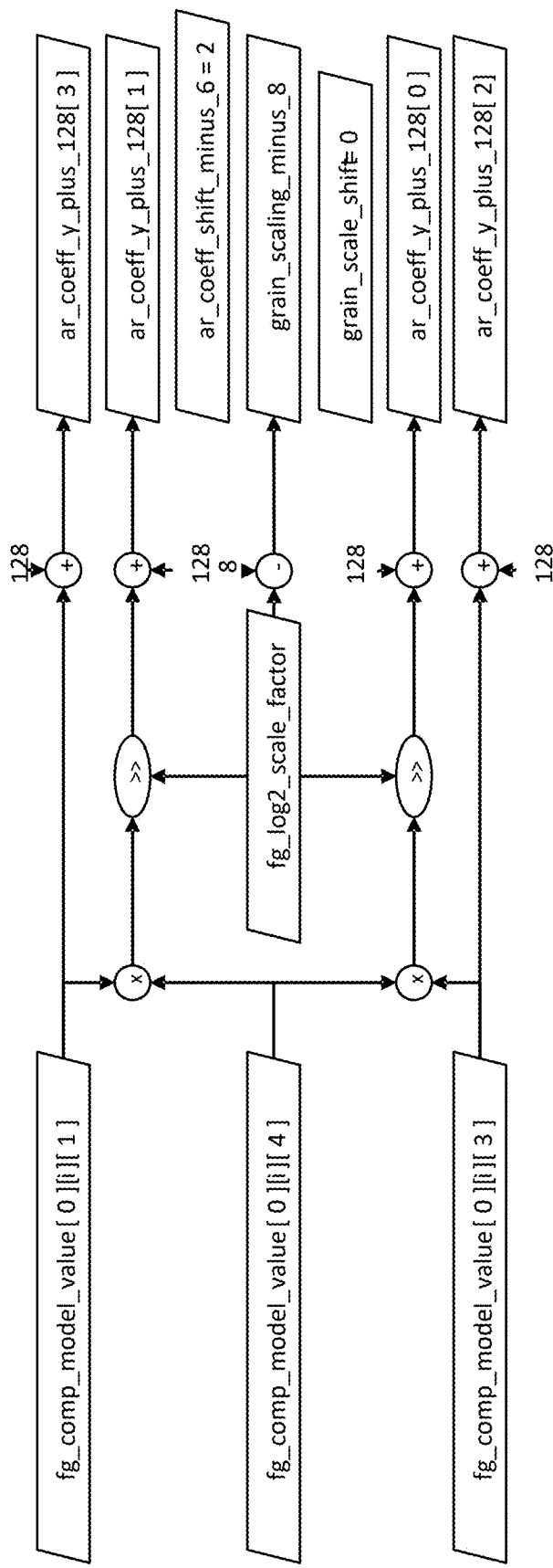
FIG. 6A depicts an example of transcoding MPEG SEI message model values to AV1 AR coefficients when AR lag is equal to 1.

FIG. 6A depicts an example of transcoding MPEG SEI message model values to AV1 AR coefficients when AR lag is equal to 1.

Figure 6B:
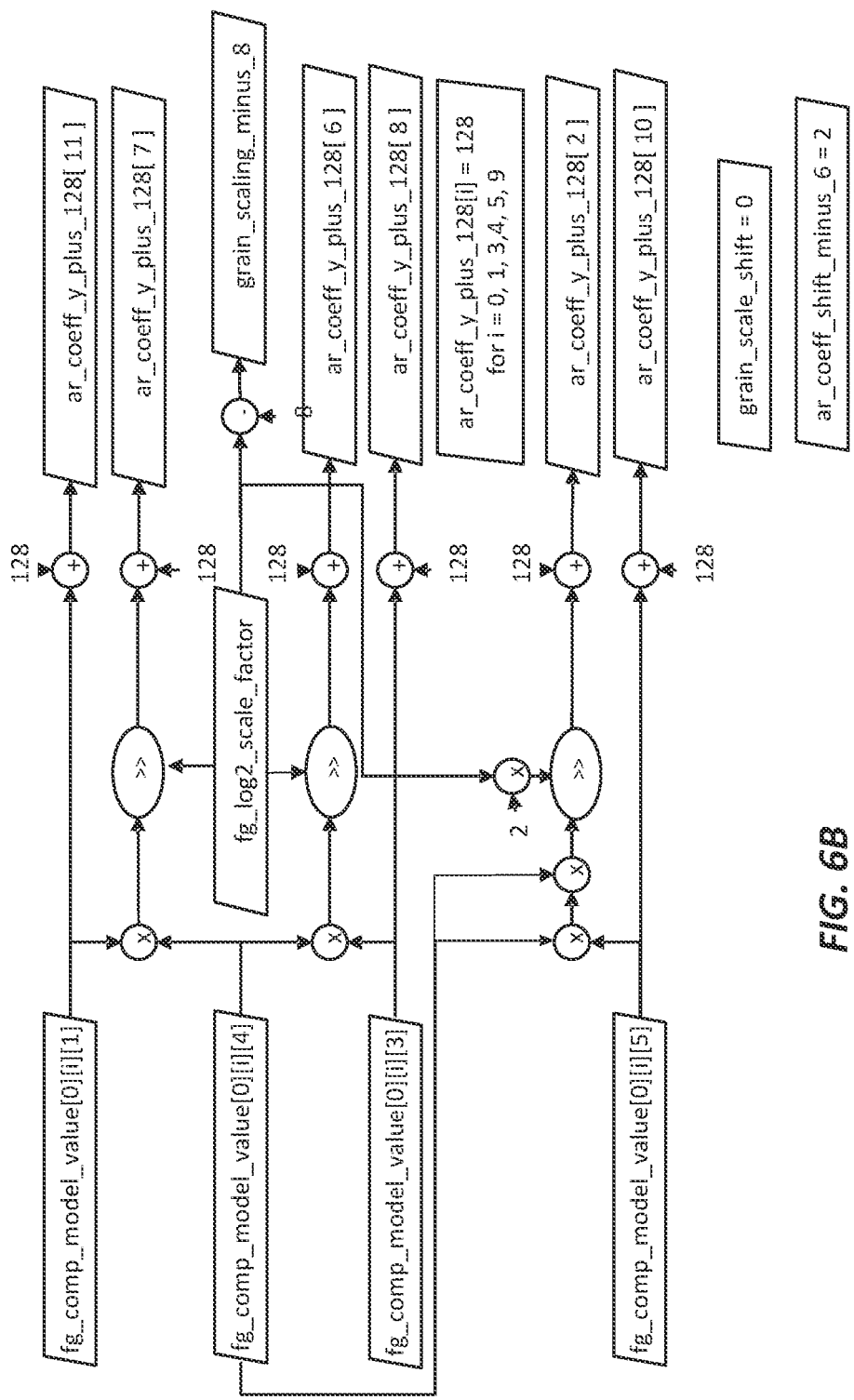
FIG. 6B depicts an example of transcoding MPEG SEI message model values to AV1 AR coefficients when AR lag is equal to 2.

FIG. 6B depicts an example of transcoding MPEG SEI message model values to AV1 AR coefficients when AR lag is equal to 2.

AV1 to MPEG Conversion of Film Grain Parameters

For greater interoperability, in some embodiments, it may be desirable to translate AV1 film-grain parameter to MPEG FG SEI parameters. For example, a content creator may want to take advantage of existing film-grain synthesis hardware or they may want to allow users to experience a similar film look regardless of whether they view MPEG- or AV1-compressed content. As before, one may establish a flag (e.g., denoted as AV12FGCenableFlag), which when all of the following constraints apply, the flag AV12FGCenableFlag shall be set equal to 1, otherwise AV12FGCenableFlag shall be set to 0. When AV12FGCenableFlag is equal to 1, the AV1 film grain model parameter values may be signaled in an MPEG FG SEI message. When AV12FGCenableFlag is equal to 0, the AV1 film grain model parameter values should not be signaled in an MPEG SEI message.

chroma_scaling_from_luma shall equal 0 ar_coeff lag shall be less than 3 fg_separate_colour_description_present_flag shall equal 0

ChromaFormatIdc shall be less than 2 (monochrome or YUV 4:2:0 only)

The content for which the MPEG SEI applies is progressive

When AV12FGCenableFlag is equal to 1 and the AV1 film grain model parameters are signaled in an MPEG SEI message, the following constraints apply for the values of the MPEG SEI syntax elements:

When apply_grain is equal to 1 and update_grain is equal to 1, the value of fg_characteristics_cancel_flag shall be equal to 0. Otherwise, when apply_grain is equal to 0, fg_characteristics_cancel flag shall be equal to 0 fg_model_id shall equal 1 fg_sepearate_colour_description_present_flag shall equal 0 fg_blending_mode_id shall equal 0 fg_log 2_scale_factor shall be equal to a value consistent with grain_scaling_minus_8 fg_num_intensity_intervals_minus1 shall be equal to num_y_points[0]−1

When ar_coeff lag is equal to 0, fg_num_model_values_minus1[0] shall equal 0. Otherwise, when ar_coeff_lag is equal to 2, fg_num_model_values_minus1 [0]

shall equal 5. Otherwise, ar_coeff_lag is equal to 1, fg num_model_values_minus1[0] shall be greater than 0 and less than 5

By way of example, the value of fg_comp_model_value [0][i][j] may be determined from ar_coeff_y_plus_128[pos], when present, as indicated in Table 6 for the case in which ar_coeff_lag is equal to 1, and Table 7 for the case in which ar_coeff_lag is equal to 2.

TABLE 6 fg_comp_model_value[ 0 ][ i ][ j ] derived from ar_coeff_y_plus_128[ pos ] when ar_coeff_lag is equal to 1

| j | fg_comp_model_value[ 0 ][ i ][ j ] |
|---|---|
| 1 | ar_coeff_y_plus_128[ 3 ] − 128 |
| 2 | 0 |
| 3 | ar_coeff_y_plus_128[ 2 ] − 128 |
| 4 | ( ( ar_coeff_y_plus_128[ 1 ] − 128 ) << fg_log2_scale_factor ) / ( ar_coeff_y_plus_128[ 3 ] − 128 ) |

TABLE 7 fg_comp_model_value[ 0 ][ i ][ j ] derived from ar_coeff_y_plus_128[ pos ] when ar_coeff_lag is equal to 2

| pos | ar_coeff_y_plus_128[ pos ] |
|---|---|
| 1 | ar_coeff_y_plus_128[ 11 ] − 128 |
| 2 | 0 |
| 3 | ar_coeff_y_plus_128[ 8 ] − 128 |
| 4 | ( ( ar_coeff_y_plus_128[ 6 ] − 128) << fg_log2_scale_factor ) / ( ar_coeff_y_plus_128[ 3 ] − 128 ) |
| 5 | ar_coeff_y_plus_128[ 10 ] − 128 |

Figure 7A:
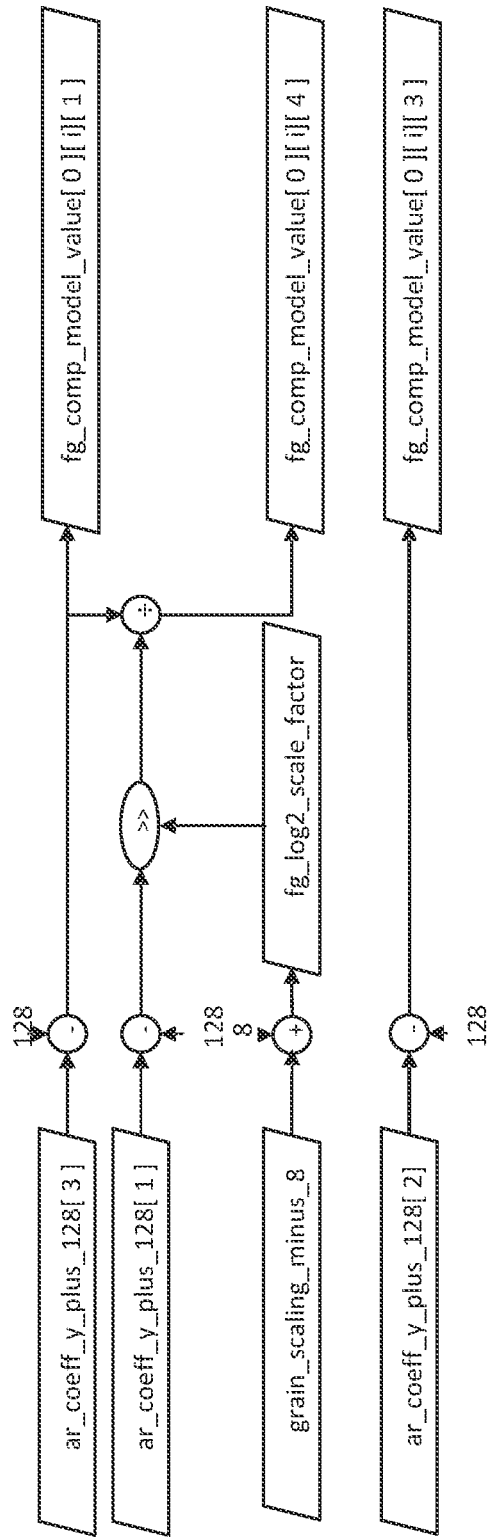
FIG. 7A and FIG. 7B each depict an example of transcoding AV1 AR coefficients to MPEG SEI message model values when AR lag is equal to 1.
Figure 7B:
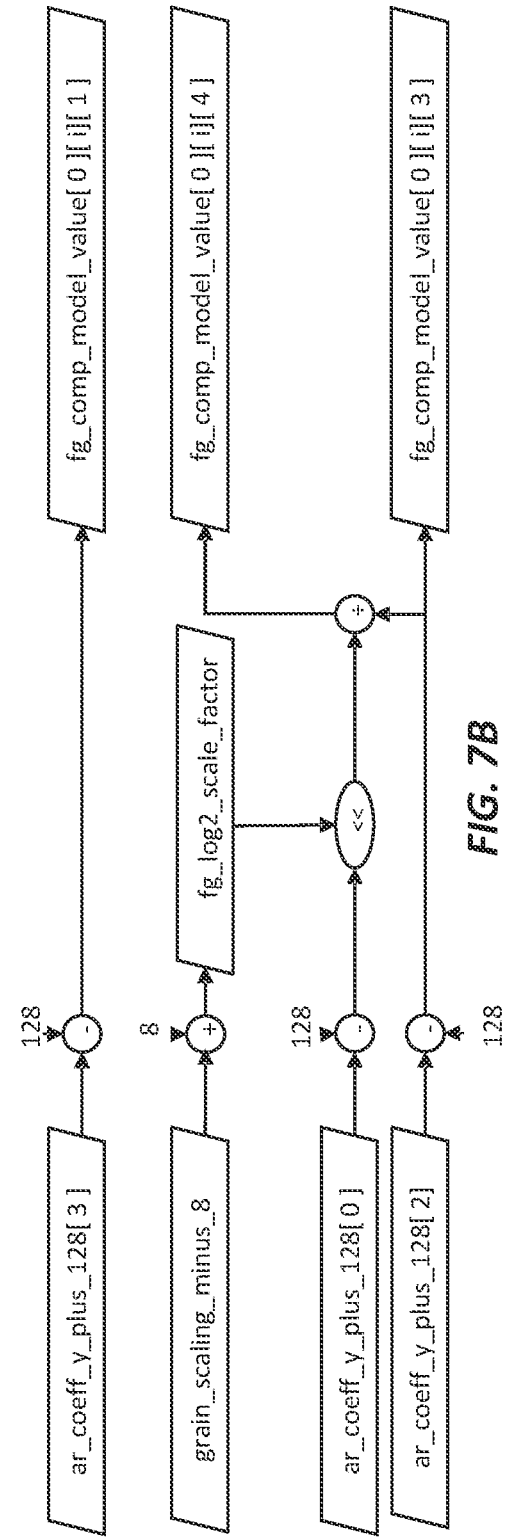

FIG. 7A and FIG. 7B each depict an example of transcoding AV1 AR coefficients to MPEG SEI message model values when AR lag is equal to 1.

Extending RDD-5 to HEVC and VVC

As discussed earlier, RDD-5 (Ref. [5]) provides a bit-accurate technology implementation of film-grain technology for AVC (H.264). This section provides some recommendations for an updated version of RDD-5 as it may apply to HEVC and VVC. Some of the recommendations have already been discussed earlier, thus their details may be omitted from this section. Appendix 2 of this document provides an example of proposed amendments to the RDD-5 frequency model in MPEG film-grain synthesis for HEVC and VVC.

As appreciated by the inventors, future versions of RDD-5 should consider at least the following:

a) In addition to supporting the frequency filtering model, also to support the autoregressive film grain model, as described earlier b) Apply film grain only to luma pixels. This helps reduce complexity and improves visual quality c) Extend grain simulation and deblocking to 16×16 blocks or higher, depending on the input resolution. This assists in reducing complexity for high-resolution content. For example, modifying the process to support 16×16 blocks may include:
 a. Calculating an average value of the pixels of a current 16×16 block in a decoded frame
 b. Using the average value to select grain model parameters for the current block
 c. Selecting a 16×16 grain block from a database using an offset of the top-left corner of the current 16×16 block in the decoded frame d) Force the scale factor, now defined as any integer value in [0, 255], to be a power of 2, and limit its maximum value to 128.

Equation (1.6) in RDD-5 Now Reads

```
for ( k = 0; k < 8; k++)
 for ( l = 0; l < 8; l++) {
  g = scale_factor * database [ h ] [ v ] [ k + k_offset ] [ l + l_offset ]
  fg_block[ k ] [ l ] = g >> (log2_scale_factor + 6)
 }
```

In an embodiment, a power of two scale factor, e.g., scale_factor=$2^x$, can be determined by rounding the value of comp_model_value[c][s][0], as illustrated below

```
g = comp_model_value [ c ] [ s ] [ 0] * database [ h ] [ v ] [ k + k_offset ] [ l + l_offset]
fg_block[ k ][ l ] = g >> (log2_scale_factor + 6)
```

If $2^x$ is closest to comp_model_value[c][s][0], then the above set of equations reduce to

```
fg block [ k ] [ l ] =
 database [ h ] [ v ] [ k + k_offset ] [ l + l_offset ] >>
 (log2_scale_factor + 6 − x )
``` e) Disable deblocking. The deblocking process can introduce dependencies, hence it may not be friendly in multi-processing architectures (e.g., SIMD). Experimental results have demonstrated that disabling deblocking has minimal effect on perceived visual quality. In an embodiment, deblocking may be enabled only for very low or very high cut-off frequencies As appreciated by the inventors, among the places where SMPTE RDD-5 needs to be generalized to support block-AvgSize greater than 8×8 include the routines for: 1) Refinement of the grain pattern database
 2) Selection of intensity interval
 3) Determination of grain block offsets
 4) Determination of grain pattern from grain blocks; and
 5) Deblocking of grain pattern at vertical boundaries of grain blocks Example code of those modifications, without limitation, is listed in Appendix 3. While Appendix 3 discusses an example implementation using a 13×13×64×64 film grain database, it is appreciated that people skilled in the art may use smaller or larger databases, depending on memory limitations.

REFERENCES

Each one of the references listed herein is incorporated by reference in its entirety.

[1] *Advanced Video Coding*, Rec. ITU-T H.264, May 2019, ITU.

[2] *High Efficiency Video Coding*, Rec. ITU-T H.265, November 2019, ITU.

[3] *Versatile Video Coding*, Rec. ITU-T H.266, August 2020, ITU.

[4] *AV1 Bitstream and Decoding Process Specification*, by P. de Rivaz et al., Version 1.0.0 with Errata, 2019-01-08.

[5] *RDD 5-2006 —SMPTE Registered Disclosure Doc— Film Grain Technology Specifications for H.264 \MPEG-4 AVC Bitstreams*, March 2006, SMPTE.

[6] *Versatile supplemental enhancement information messages for coded video bitstreams*, Rec. ITU-T H.274, August 2020, ITU.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to film-grain metadata signaling and conversion in image and video coding, such as those described herein. The computer and/or IC may compute any of a variety of parameters or values that relate to film-grain metadata signaling and conversion in image and video coding described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder, or the like may implement methods related to film-grain metadata signaling and conversion in image and video coding as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to film-grain metadata signaling and conversion in image and video coding are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Appendix 1

Example addendum to Section 8.5, Film grain characteristics SEI message, of VVC SEI messaging (Ref. [6]) to support film grain synthesis during MPEG decoding according to the AV1 specification.

8.5.3 Film Grain Synthesis Process for AR Model with Additive Blending Mode

The process requires the definition of the following variables:

A picture width and picture height in units of luma samples, denoted herein by PicWidthInLumaSamples and PicHeightInLumaSamples, respectively.

A chroma format indicator, denoted herein by ChromaFormatIdc, as described in clause 7.3.

A bit depth for the samples of the luma component, denoted herein by BitDepthY, and when ChromaFormatIdc is not equal to 0, a bit depth for the samples of the two associated chroma components, denoted herein by BitDepthC. BitDepthY is set equal to BitDepthC, and is denoted as BitDepth.

The process requires the further constraint of the following variables:

fg_model_id shall be equal to 1 (autoregressive).

fg_blending_mode_id shall equal to 0 (additive).

fg_separate_colour_description_present_flag shall be equal to 0.

ChromaFormatIdc shall be less than 2 (monochrome when ChromaFormatIdc is equal to 0 or YUV 4:2:0 when ChromaFormatIdc is equal to 1).

The value of fg_intensity_interval_upper_bound[0][i] shall be equal to fg_intensity_interval_lower_bound[0][i+1]−1 and the value of fg_intensity_interval_lower_bound[0][i+1] shall be equal to fg_intensity_interval_upper_bound[0][i]+1, which is consistent with representation of intensity intervals using a piecewise continuous model. (Note that this constraint also disallows multi-generational film grain synthesis).

fg_comp_model_value[c][i][2] shall be equal to 0 fg_comp_model_value[c][i][1] shall be equal to an ar value, denoted as ar_value1[c], for c=0 . . . 2 and i=0 . . . fg_num_intensity_intervals_minus1[c]

fg_comp_model_value[c][i][3] shall be equal to an ar, denoted as ar_value3[c], for c=0 . . . 2 and i=0 . . . fg_num_intensity_intervals_minus1[c]

fg_comp_model_value[c][i][4] shall be equal to an ar value, denoted as ar_value4[c], for c=0 . . . 2 and i=0 . . . fg_num_intensity_intervals_minus1[c]

fg_comp_model_value[c][i][5] shall be equal to an ar value, denoted as ar_value5[c], for c=0 . . . 2 and i=0 . . . fg_num_intensity_intervals_minus1[c]

The input to this process are the decoded picture sample array IdecodedY and, when ChromaFormatIdc is equal to 1, the arrays IdecodedU and IdecodedV.

Outputs of this process are the modified picture sample array IgrainY and, when
ChromaFormatIdc is equal to 1, the arrays IgrainU and IgrainV.
The variable GrainCenter is set equal to 128 «(BitDepth—8).
The variable GrainMin is set equal to =−GrainCenter.
The variable GrainMax is set equal to (256 «(BitDepth—8))−1−GrainCenter.
The variable ScalinShift is set equal to fg_log 2_scale_factor
The film grain synthesis process can be described as follows. Given AR coefficients and a Gaussian sequence, a film grain template (64×64, implementation wise, using 82×73) is first generated. With a pseudo-random generator, the decoder generates offsets for a 32×32 block (or +2 additional row/columns when overlap is used) inside the film grain template. The pseudo-random generator is initialized in the beginning of each row of 32×32 blocks to allow parallel row processing. The generator is initialized based on a GrainSeed element. The 32×32 block of the film grain is scaled, and added to the reconstructed samples, and the clipping is applied. For 4:2:0, the block size for chroma components are twice smaller for 4:2:0.
The grain seed (GrainSeed) generation process is invoked as specified in clause 8.5.3.1.
The pseudo-random number generation process is invoked as specified in clause 8.5.3.2.
The grain template generation process is invoked as specified in clause 8.5.3.3.
The scaling lookup initialization process is invoked as specified in clause 8.5.3.4.
The add noise process is invoked as specified in clause 8.5.3.5.

8.5.3.1 Grain seed generation process
The variable GrainSeed (or grain seed) specifies the starting value for the pseudo-random number generator used in film grain synthesis. In particular, GrainSeed contains the value used to initialize a 16-bit variable RandRegister (or RandomRegister). GrainSeed generation follows cause 1.5.2.1 Seed initialization in SMPTE RDD-5 for luma component.

8.5.3.2 Random Number Generation Process
The input of the process is the variable nBits. The output of the process is the variable randResult.
The random number generation process is specified with the function randResult=getRandNum(nBits).

```
function randResult = getRandNum(nBits)
  rVal = RandRegister
  newBit=((rVal >> 0) ^ (rVal >> 1) ^ (rVal >> 3) ^ (rVal >> 12)) & 1
  rVal = (rVal >> 1) | (newBit << 15)
  randResult = (rVal >> (16 − nBits)) & ((1 << nBits) − 1)
  RandRegister = rVal
```

8.5.3.3 Grain Template Generation Process
The output of this process is the film grain template GrainTemplate[cIdx][y][x], where the variable cIdx is the color component index, y=0 . . . nCurrSh, and x=0 . . . nCurrSw. When cIdx is equal to 0 (luma component), nCurrSw=82, nCurrSh=73. When ChromaFormatIdc=1, nCurrSw=44, nCurrSh=38 for cIdx is equal to 1 or 2 (chroma component).
The array gaussianSequence contains random samples from a Gaussian distribution with zero mean and standard deviation of about 512 clipped to the range of [−2048, 2047] and rounded to the nearest multiple of 4.

gaussianSequence[2048]={56, 568, −180, 172, 124, −84, 172, −64, −900, 24, 820, 224, 1248, 996, 272, −8, −916, −388, −732, −104, −188, 800, 112, −652, −320, −376, 140, −252, 492, −168, 44, −788, 588, −584, 500, −228, 12, 680, 272, −476, 972, −100, 652, 368, 432, −196, −720, −192, 1000, −332, 652, −136, −552, −604, −4, 192, −220, −136, 1000, −52, 372, −96, −624, 124, −24, 396, 540, −12, −104, 640, 464, 244, −208, −84, 368, −528, −740, 248, −968, −848, 608, 376, −60, −292, −40, −156, 252, −292, 248, 224, −280, 400, −244, 244, −60, 76, −80, 212, 532, 340, 128, −36, 824, −352, −60, −264, −96, −612, 416, −704, 220, −204, 640, −160, 1220, −408, 900, 336, 20, −336, −96, −792, 304, 48, −28, −1232, −1172, −448, 104, −292, −520, 244, 60, −948, 0, −708, 268, 108, 356, −548, 488, −344, −136, 488, −196, −224, 656, −236, −1128, 60, 4, 140, 276, −676, −376, 168, −108, 464, 8, 564, 64, 240, 308, −300, −400, −456, −136, 56, 120, −408, −116, 436, 504, −232, 328, 844, −164, −84, 784, −168, 232, −224, 348, −376, 128, 568, 96, −1244, −288, 276, 848, 832, −360, 656, 464, −384, −332, −356, 728, −388, 160, −192, 468, 296, 224, 140, −776, −100, 280, 4, 196, 44, −36, −648, 932, 16, 1428, 28, 528, 808, 772, 20, 268, 88, −332, −284, 124, −384, −448, 208, −228, −1044, −328, 660, 380, −148, −300, 588, 240, 540, 28, 136, −88, −436, 256, 296, −1000, 1400, 0, −48, 1056, −136, 264, −528, −1108, 632, −484, −592, −344, 796, 124, −668, −768, 388, 1296, −232, −188, −200, −288, −4, 308, 100, −168, 256, −500, 204, −508, 648, −136, 372, −272, −120, −1004, −552, −548, −384, 548, −296, 428, −108, −8, −912, −324, −224, −88, −112, −220, −100, 996, −796, 548, 360, −216, 180, 428, −200, −212, 148, 96, 148, 284, 216, −412, −320, 120, −300, −384, −604, −572, −332, −8, −180, −176, 696, 116, −88, 628, 76, 44, −516, 240, −208, −40, 100, −592, 344, −308, −452, −228, 20, 916, −1752, −136, −340, −804, 140, 40, 512, 340, 248, 184, −492, 896, −156, 932, −628, 328, −688, −448, −616, −752, −100, 560, −1020, 180, −800, −64, 76, 576, 1068, 396, 660, 552, −108, −28, 320, −628, 312, −92, −92, −472, 268, 16, 560, 516, −672, −52, 492, −100, 260, 384, 284, 292, 304, −148, 88, −152, 1012, 1064, −228, 164, −376, −684, 592, −392, 156, 196, −524, −64, −884, 160, −176, 636, 648, 404, −396, −436, 864, 424, −728, 988, −604, 904, −592, 296, −224, 536, −176, −920, 436, −48, 1176, −884, 416, −776, −824, −884, 524, −548, −564, −68, −164, −96, 692, 364, −692, −1012, −68, 260, −480, 876, −1116, 452, −332, −352, 892, −1088, 1220, −676, 12, −292, 244, 496, 372, −32, 280, 200, 112, −440, −96, 24, −644, −184, 56, −432, 224, −980, 272, −260, 144, −436, 420, 356, 364, −528, 76, 172, −744, −368, 404, −752, −416, 684, −688, 72, 540, 416, 92, 444, 480, −72, −1416, 164, −1172, −68, 24, 424, 264, 1040, 128, −912, −524, −356, 64, 876, −12, 4, −88, 532, 272, −524, 320, 276, −508, 940, 24, −400, −120, 756, 60, 236, −412, 100, 376, −484, 400, −100, −740, −108, −260, 328, −268, 224, −200, −416, 184, −604, −564, −20, 296, 60, 892, −888, 60, 164, 68, −760, 216, −296, 904, −336, −28, 404, −356, −568, −208, −1480, −512, 296, 328, −360, −164, −1560, −776, 1156, −428, 164, −504, −112, 120, −216, −148, −264, 308, 32, 64, −72, 72, 116, 176, −64, −272, 460, −536, −784, −280, 348, 108, −752, −132, 524, −540, −776, 116, −296, −1196, −288, −560, 1040, −472, 116, −848, −1116, 116, 636, 696, 284, −176, 1016, 204, −864, −648, −248, 356, 972, −584, −204, 264, 880, 528, −24, −184, 116, 448, −144, 828, 524, 212, −212, 52, 12, 200, 268, −488, −404, −880, 824, −672, −40, 908, −248, 500, 716, −576, 492, −576, 16, 720, −108, 384, 124, 344, 280, 576, −500, 252, 104, −308, 196, −188, −8, 1268, 296, 1032, −1196, 436, 316, 372, −432, −200, −660, 704, −224, 596, −132, 268, 32, −452, 884, 104, −1008, 424, −1348, −280, 4, −1168, 368, 476, 696, 300, −8, 24, 180, −592, −196, 388, 304, 500, 724, −160, 244, −84, 272, −256, −420, 320, 208, −144, −156, 156, 364, 452, 28, 540, 316, 220, −644, −248, 464, 72, 360, 32, −388, 496, −680, −48, 208, −116, −408, 60, −604, −392, 548, −840, 784, −460, 656, −544, −388, −264, 908, −800, −628, −612, −568, 572, −220, 164, 288, −16, −308, 308, −112, −636, −760, 280, −668, 432, 364, 240, −196, 604, 340, 384, 196, 592, −44, −500, 432, −580, −132, 636, −76, 392, 4, −412, 540, 508, 328, −356, −36, 16, −220, −64, −248, −60, 24, −192, 368, 1040, 92, −24, −1044, −32, 40, 104, 148, 192, −136, −520, 56, −816, −224, 732, 392, 356, 212, −80, −424, −1008, −324, 588, −1496, 576, 460, −816, −848, 56, −580, −92, −1372, −112, −496, 200, 364, 52, −140, 48, −48, −60, 84, 72, 40, 132, −356, −268, −104, −284, −404, 732, −520, 164, −304, −540, 120, 328, −76, −460, 756, 388, 588, 236, −436, −72, −176, −404, −316, −148, 716, −604, 404, −72, −88, −888, −68, 944, 88, −220, −344, 960, 472, 460, −232, 704, 120, 832, −228, 692, −508, 132, −476, 844, −748, −364, −44, 1116, −1104, −1056, 76, 428, 552, −692, 60, 356, 96, −384, −188, −612, −576, 736, 508, 892, 352, −1132, 504, −24, −352, 324, 332, −600, −312, 292, 508, −144, −8, 484, 48, 284, −260, −240, 256, −100, −292, −204, −44, 472, −204, 908, −188, −1000, −256, 92, 1164, −392, 564, 356, 652, −28, −884, 256, 484, −192, 760, −176, 376, −524, −452, −436, 860, −736, 212, 124, 504, −476, 468, 76, −472, 552, −692, −944, −620, 740, −240, 400, 132, 20, 192, −196, 264, −668, −1012, −60, 296, −316, −828, 76, −156, 284, −768, −448, −832, 148, 248, 652, 616, 1236, 288, −328, −400, −124, 588, 220, 520, −696, 1032, 768, −740, −92, −272, 296, 448, −464, 412, −200, 392, 440, −200, 264, −152, −260, 320, 1032, 216, 320, −8, −64, 156, −1016, 1084, 1172, 536, 484, −432, 132, 372, −52, −256, 84, 116, −352, 48, 116, 304, −384, 412, 924, −300, 528, 628, 180, 648, 44, −980, −220, 1320, 48, 332, 748, 524, −268, −720, 540, −276, 564, −344, −208, −196, 436, 896, 88, −392, 132, 80, −964, −288, 568, 56, −48, −456, 888, 8, 552, −156, −292, 948, 288, 128, −716, −292, 1192, −152, 876, 352, −600, −260, −812, −468, −28, −120, −32, −44, 1284, 496, 192, 464, 312, −76, −516, −380, −456, −1012, −48, 308, −156, 36, 492, −156, −808, 188, 1652, 68, −120, −116, 316, 160, −140, 352, 808, −416, 592, 316, −480, 56, 528, −204, −568, 372, −232, 752, −344, 744, −4, 324, −416, −600, 768, 268, −248, −88, −132, −420, −432, 80, −288, 404, −316, −1216, −588, 520, −108, 92, −320, 368, −480, −216, −92, 1688, −300, 180, 1020, −176, 820, −68, −228, −260, 436, −904, 20, 40, −508, 440, −736, 312, 332, 204, 760, −372, 728, 96, −20, −632, −520, −560, 336, 1076, −64, −532, 776, 584, 192, 396, −728, −520, 276, −188, 80, −52, −612, −252, −48, 648, 212, −688, 228, −52, −260, 428, −412, −272, −404, 180, 816, −796, 48, 152, 484, −88, −216, 988, 696, 188, −528, 648, −116, −180, 316, 476, 12, −564, 96, 476, −252, −364, −376, −392, 556, −256, −576, 260, −352, 120, −16, −136, −260, −492, 72, 556, 660, 580, 616, 772, 436, 424, −32, −324, −1268, 416, −324, −80, 920, 160, 228, 724, 32, −516, 64, 384, 68, −128, 136, 240, 248, −204, −68, 252, −932, −120, −480, −628, −84, 192, 852, −404, −288, −132, 204, 100, 168, −68, −196, −868, 460, 1080, 380, −80, 244, 0, 484, −888, 64, 184, 352, 600, 460, 164, 604, −196, 320, −64, 588, −184, 228, 12, 372, 48, −848, −344, 224, 208, −200, 484, 128, −20, 272, −468, −840, 384, 256, −720, −520, −464, −580, 112, −120, 644, −356, −208, −608, −528, 704, 560, −424, 392, 828, 40, 84, 200, −152, 0, −144, 584, 280, −120, 80, −556, −972, −196, −472, 724, 80, 168, −32, 88, 160, −688, 0, 160, 356, 372, −776, 740, −128, 676, −248, −480, 4, −364, 96, 544, 232, −1032, 956, 236, 356, 20, −40, 300, 24, −676, −596, 132, 1120, −104, 532, −1096, 568, 648, 444, 508, 380, 188, −376, −604, 1488, 424, 24, 756, −220, −192, 716, 120, 920, 688, 168, 44, −460, 568, 284, 1144, 1160, 600, 424, 888, 656, −356, −320, 220, 316, −176, −724, −188, −816, −628, −348, −228, −380, 1012, −452, −660, 736, 928, 404, −696, −72, −268, −892, 128, 184, −344, −780, 360, 336, 400, 344, 428, 548, −112, 136, −228, −216, −820, −516, 340, 92, −136, 116, −300, 376, −244, 100, −316, −520, −284, −12, 824, 164, −548, −180, −128, 116, −924, −828, 268, −368, −580, 620, 192, 160, 0, −1676, 1068, 424, −56, −360, 468, −156, 720, 288, −528, 556, −364, 548, −148, 504, 316, 152, −648, −620, −684, −24, −376, −384, −108, −920, −1032, 768, 180, −264, −508, −1268, −260, −60, 300, −240, 988, 724, −376, −576, −212, −736, 556, 192, 1092, −620, −880, 376, −56, −4, −216, −32, 836, 268, 396, 1332, 864, −600, 100, 56, −412, −92, 356, 180, 884, −468, −436, 292, −388, −804, −704, −840, 368, −348, 140, −724, 1536, 940, 372, 112, −372, 436, −480, 1136, 296, −32, −228, 132, −48, −220, 868, −1016, −60, −1044, −464, 328, 916, 244, 12, −736, −296, 360, 468, −376, −108, −92, 788, 368, −56, 544, 400, −672, −420, 728, 16, 320, 44, −284, −380, −796, 488, 132, 204, −596, −372, 88, −152, −908, −636, −572, −624, −116, −692, −200, −56, 276, −88, 484, −324, 948, 864, 1000, −456, −184, −276, 292, −296, 156, 676, 320, 160, 908, −84, −1236, −288, −116, 260, −372, −644, 732, −756, −96, 84, 344, −520, 348, −688, 240, −84, 216, −1044, −136, −676, −396, −1500, 960, −40, 176, 168, 1516, 420, −504, −344, −364, −360, 1216, −940, −380, −212, 252, −660, −708, 484, −444, −152, 928, −120, 1112, 476, −260, 560, −148, −344, 108, −196, 228, −288, 504, 560, −328, −88, 288, −1008, 460, −228, 468, −836, −196, 76, 388, 232, 412, −1168, −716, −644, 756, −172, −356, −504, 116, 432, 528, 48, 476, −168, −608, 448, 160, −532, −272, 28, −676, −12, 828, 980, 456, 520, 104, −104, 256, −344, −4, −28, −368, −52, −524, −572, −556, −200, 768, 1124, −208, −512, 176, 232, 248, −148, −888, 604, −600, −304, 804, −156, −212, 488, −192, −804, −256, 368, −360, −916, −328, 228, −240, −448, −472, 856, −556, −364, 572, −12, −156, −368, −340, 432, 252, −752, −152, 288, 268, −580, −848, −592, 108, −76, 244, 312, −716, 592, −80, 436, 360, 4, −248, 160, 516, 584, 732, 44, −468, −280, −292, −156, −588, 28, 308, 912, 24, 124, 156, 180, −252, 964, −924, −772, −520, −428, −624, 300, −212, −1144, 32, −724, 800, −1128, −212, −1288, −848, 180, −416, 440, 192, −576, −792, −76, −1080, 80, −532, −352, −132, 380, −820, 148, 1112, 128, 164, 456, 700, −924, 144, −668, −384, 648, −832, 508, 552, −52, −100, −656, 208, −568, 748, −88, 680, 232, 300, 192, −408, −1012, −152, −252, −268, 272, −876, −664, −648, −332, −136, 16, 12, 1152, −28, 332, −536, 320, −672, −460, −316, 532, −260, 228, −40, 1052, −816, 180, 88, −496, −556, −672, −368, 428, 92, 356, 404, −408, 252, 196, −176, −556, 792, 268, 32, 372, 40, 96, −332, 328, 120, 372, −900, −40, 472, −264, −592, 952, 128, 656, 112, 664, −232, 420, 4, −344, −464, 556, 244, −416, −32, 252, 0, −412, 188, −696, 508, −476, 324, −1096, 656, −312, 560, 264, −136, 304, 160, −64, −580, 248, 336, −720, 560, −348, −288, −276, −196, −500, 852, −544, −236, −1128, −992, −776, 116, 56, 52, 860, 884, 212, −12, 168, 1020, 512, −552, 924, −148, 716, 188, 164, −340, −520, −184, 880, −152, −680, −208, −1156, −300, −528, −472, 364, 100, −744, −1056, −32, 540, 280, 144, −676, −32, −232, −280, −224, 96, 568, −76, 172, 148, 148, 104, 32, −296, −32, 788, −80, 32, −16, 280, 288, 944, 428, −484};

The variable scaleShift is set to 12—BitDepth

The film grain templates are generated as follows.

If cIdx is equal to 1, RandRegister is set to GrainSeed^0xb524
If cIdx is equal to 2, RandRegister is set to GrainSeed^0x49d8

```
for ( y = 0; y < nCurrSh; y++ ) {
    for ( x = 0; x < nCurrSw; x++ ) {
        if ( fg_comp_model_present_flag [ cIdx ] > 0 )
```

GrainTemplate[cIdx][y][x]=(gaussianSequence[getRandNum(11)]+2scaleShift-1)»scaleShift
The variable ar_coeff_lag is set equal to 2.
The variable aRCoeffShift is set equal to 8
The variable numPos[cIdx] is set as the follows:

- If cIdx = 0, numPos[cIdx] = 2 * ar_coeff_lag * (ar_coeff_lag+1)
- Otherwise (cIdx != 0), numPos[cIdx] = numPos[0] + 1

The array aRCoeffs[cIdx][pos], for pos=0 . . . numPos[cIdx]−1 is set equal to 0, except the following.

aRCoeffs[cIdx] [ 2 ] is set equal to ( ((ar_value5[cIdx] * ar_value4[cIdx] * ar_value4[cIdx])<< aRCoeffShift) + (1<<(ScalingShift+1))) >> (3*ScalingShift)
aRCoeffs[cIdx] [ 6 ] is set equal to (((ar_value3[cIdx] * ar_value4[cIdx])<< aRCoeffShift) + (1 << ScalingShift)) >> (2*ScalingShift)
aRCoeffs[cIdx] [ 7 ] is set equal to (((ar_value1[cIdx] * ar_value4[cIdx])<< aRCoeffShift) + (1 << ScalingShift)) >> (2*ScalingShift)
aRCoeffs[cIdx] [ 8 ] is set equal to ((ar_value3[cIdx]<<aRCoeffShift) + (1 << (ScalingShift−1))) >> ScalingShift
aRCoeffs[cIdx] [ 10 ] is set equal to ((ar_value5[cIdx]<<aRCoeffShift) + (1 << (ScalingShift−1))) >> ScalingShift
aRCoeffs aRCoeffs[cIdx] [ 11 ] is set equal to ((ar_value1[cIdx]<<aRCoeffShift) + (1 << (ScalingShift−1))) >> ScalingShift The grain template for each cIdx is generated as follows:

```
for ( y = 3; y < nCurrSh; y++ ) {
    for ( x = 3; x < nCurrSw − 3; x++ ) {
        pos = 0, s = 0
        for ( idxY = −ar_coeff_lag; idxY <= 0; idxY ++ )
            for (idxX = −ar_coeff_lag; idxX <= ar_coeff_lag && (idxY!=0 || idxX != 0); idxX ++ )
                s += grain Template[cIdx][ [ y + idxY] [ x + idxX] * aRCoeffs[cIdx] [ pos++ ]
        GrainTemplate [cIdx][y][x] = Clip3(−2BitDepth-1, 2BitDepth-1−1,
            GrainTemplate[[Idx][y][x] + (( s + 2aRCoeffShift−1) >> aRCoeffShift
    }
}
```

8.5.3.4 scalingLut Initialization

For a color plane cIdx, the following initialization procedure is envoked to initialize the ScalingLut[cIdx][256].
The variable NumPoints[cIdx] for cIdx=0 . . . 2 is set as following:

- if fg_comp_model_present_flag[ cIdx ] is equal to 0, NumPoints[cIdx] is set to 0.
- Otherwise (fg_comp_model_present_flag [ cIdx ] is not equal to 0), NumPoints[ cIdx ] is set to equal to fg_num_intensity_intervals_minus1 [ cIdx ] + 1, .

```
if ( NumPoints[ cIdx ] == 0 ) {
    for ( x = 0; x < 256; x++ )
        ScalingLut[cIdx][ x ] = 0
} else {
    for ( x = 0; x < fg_intensity_interval_lower_bound[ c ][ 0 ] [ 0 ]; x++ )
        ScalingLut[cIdx][ x ] = 0
    for ( i = 0; i < = fg_num_intensity_intervals_minus1[ c ]; i++ ) {
        dX = fg_intensity_interval_upper_bound[ cIdx ][ i + 1 ] − fg_intensity_interval_lower_bound[ cIdx ][ i ]
        for ( x = 0; x < dX; x++ )
            ScalingLut[cIdx][ fg_intensity_interval_lower_bound[ cIdx ] [ i ] + x ]
            =   fg_comp_model_value[ c ][ i ][ 0 ]
    }
    for ( x = fg_intensity_interval_upper_bound[ cIdx ][ fg_num_intensity_intervals_minus1[ c ] ]; x < 256; x++ )
        ScalingLut[cIdx][ x ] = 0
}
```

To obtain values of the scaling function, the following procedure is invoked with the color plane index cIdx and the input value pointVal as inputs. The output is the value of the scaling function pointScal.

```
scaleLut(cIdx, pointVal) {
  if ( BitDepth == 8)
    pointScal = ScalingLut[cIdx][ pointVal ]
  else
    x = Clip3( 0, 255,
( pointVal + ( 1 << ( BitDepth − 9 ) ) ) >> (BitDepth[c] − 8 ) )
    pointScal = ScalingLut[cIdx][x]
```

8.5.3.5 Add Noise Process

Inputs to this process are the reconstructed picture prior to adding film grain, i.e., the array recPictureL and, when ChromaFomatIdc is not equal to 0, the arrays recPictureCb and recPictureCr.

Outputs of this process are the modified reconstructed picture after adding film grain, i.e., the array recPictureL and, when ChromaFomatIdc is not equal to 0, the arrays recPictureCb and recPictureCr.

The pseudo-random generator is initialized in the beginning of each row of 32×32 blocks to allow parallel row processing ((denoted as variable rowNum). The generator is initialized based on a GrainSeed element. For every 32×32 block, with a pseudo-random generator getRandNum(8), a 34×34 array grSCur[cIdx] is generated from GrainTemplate [cIdx]. grSCur[cIdx] is then assigned to the picture array grPlanes[cIdx]. The variable cIdx specifies the color component index.

```
rowNum = 0
for ( y = 0; y < (picHeightInLumaSamples + 1) >> 1; y += 16 ) {
  RandRegister = GrainSeed
  RandRegister ^= ((rowNum * 37 + 178) & 255) << 8
  RandRegister ^= ((rowNum * 173 + 105) & 255)
  for (x=0; x < (picWidthInLumaSamples + 1) >> 1; x += 16 ) {
    rand = getRandNum( 8 )
    offsetX = rand >> 4
    offsetY = rand & 15
    for ( cIdx = 0; cIdx < 3; cIdx ++ ) {
      cSubsX = (cIdx > 0) ? subsX : 0
      cSubsY = (cIdx > 0) ? subsY : 0
      planeOffsetX = cSubsX? 6 + offsetX : 9 + offsetX * 2
      planeOffsetY = cSubsY? 6 + offsetY : 9 + offsetY * 2
      for ( i = 0; i < 34 >> cSubsY; i++ )
        for ( j = 0; j < 34 >> cSubsX; j++ ) {
          grSCur[cIdx][ i ][ j ] = GrainTemplate [cIdx]
[ planeOffsetY + i ][ planeOffsetX + j ]
          if (overlap_flag)
            blendingOperation(grSCur[cIdx])
          grPlanes[cIdx][y+i][x+j] = grSCur[cIdx][ i ][ j ]
        }
      }
    }
  }
  rowNum++
}
```

When NumPoints[0] is larger than 0, the film grain is added to the luma ccomponent recPictureL.

```
for ( y = 0; y < PicHeightInLumaSamples ; y++ ) {
  for ( x = 0; x < PicWidthInLumaSamples ; x++ ) {
    grSamp = ( scaleLut( 0, recPictureL[y][x]) * grPlanes[ 0 ][ y ][ x ] +
2ScalingShift−1) >> ScalingShift
      recPictureL[ y ][ x ] = Clip3(min Val[0], max Val[0], recPictureL[y][x]+
grSamp)
    }
}
```

When ChromaFormatIdc is larger than 0 and NumPoints[cIdx] is larger than 0 where cIdx is equal to 1 or 2, the film grain is added to the chroma components recPictureC chroma samples. recPictureC refers to recPictureCb when cIdx is equal to 1 and refers to recPictureCr when cIdx is equal to 2

```
for ( y = 0; y < PicHeightInLumaSamples / SubHeightC ; y++ ) {
  for ( x = 0; x < PicWidthInLumaSamples/ SubWidthC ; x++ ) {
    grSamp = ( scaleLut( cIdx, recPictureC[y][x]) * grPlanes[ cIdx ][ y ][ x ] +
2scalingShift−1) >> ScalingShift
      recPictureC[ y ][ x ] = Clip3(min Val[cIdx], max Val[cIdx], recPictureC[y][x]+
grSamp)
    }
}
```

The variable minVal[cIdx] and maxVal[cIdx] is specified as follows: If fg_full_range_flag is equal to 1, minVal[cIdx] is equal to 0, and maxVal[cIdx] is equal to 2BitDepth—1 when cIdx is equal to 0, 1 or 2.

Otherwise if fg_full_range_flagis is equal to 0, minVal[1] and minVal[2] is equal to 16*2BitDepth-8 and maxVal[0] is equal to 235*2BitDepth-8.

If fg_matrix_coeffs is equal to 0, maxVal[1] and maxVal[2] are equal to 235*2BitDepth-8 otherwise, maxVal[1] and maxVal[2] are equal to 240*2BitDepth-8

Appendix 2

Example addendum to Section 8.5, Film grain characteristics SEI message, of VVC SEI messaging (Ref. [6]) to support film grain synthesis during MPEG decoding for different picture sizes and the frequency filtering model. Proposed amendments are shown in an Italic font.

Modify the location and text of Note 3 in the following text:

"NOTE 1—SMPTE RDD 5 specifies a film grain simulator based on the information provided in the film grain characteristics SEI message.

Use of this SEI message requires the definition of the following variables:

A picture width and picture height in units of luma samples, denoted herein by PicWidthInLumaSamples and PicHeightInLumaSamples, respectively.

When the syntax element fg_separate_colour_description_present_flag of the film grain characteristics SEI message is equal to 0, the following additional variables:

A chroma format indicator, denoted herein by ChromaFormatIdc, as described in clause 7.3.

A bit depth for the samples of the luma component, denoted herein by $BitDepth_Y$, and when ChromaFormatIdc is not equal to 0, a bit depth for the samples of the two associated chroma components, denoted herein by $BitDepth_C$."

As follows:

"Use of this SEI message requires the definition of the following variables:

A picture width and picture height in units of luma samples, denoted herein by PicWidthInLumaSamples and PicHeightInLumaSamples, respectively.

When the syntax element fg_separate_colour_description_present_flag of the film grain characteristics SEI message is equal to 0, the following additional variables:

A chroma format indicator, denoted herein by ChromaFormatIdc, as described in clause 7.3.

A bit depth for the samples of the luma component, denoted herein by $BitDepth_Y$, and when ChromaFormatIdc is not equal to 0, a bit depth for the samples of the two associated chroma components, denoted herein by $BitDepth_C$.

NOTE 2—SMPTE RDD 5 specifies a film grain simulator based on the information provided in the film grain characteristics SEI message when PicWidthInLumaSamples is less than or equal to 1920 and PicHeightInLumaSamples is less than or equal to 1080."

Modify the following:

"Depending on the value of fg_model_id, the selection of the one or more intensity intervals for the sample value $I_{decoded}[c][x][y]$ is specified as follows:

The variable numApplicableIntensityIntervals[c][x][y] is initially set equal to 0.

If fg_model_id is equal to 0, the following applies:

The top-left sample location (xB, yB) of the current 8×8 block b that contains the sample value $I_{decoded}[c][x][y]$ is derived as (xB, yB)=(x/8, y/8).

The average value $b_{avg}$ of the current 8×8 block b is derived as follows:

--- sum8×8 = 0 for( i = 0; i < 8; i++ )

for( j = 0; j < 8; j++ )

sum8×8 += $I_{decoded}$[ c ][ xB * 8 + i ][ yB * 8 + j ]    (1)

$b_{avg}$ = Clip3( 0, 255, ( sum8×8 + ( 1 << ( fgBitDepth[c] − 3 ) ) ) >> ( fgBitDepth[c] − 2 ) )"

---

As follows:

"Depending on the value of fg_model_id, the selection of the one or more intensity intervals for the sample value $I_{decoded}[c][x][y]$ is specified as follows:

The variable numApplicableIntensityIntervals[c][x][y] is initially set equal to 0.

The variable blockAvgSize is derived as blockAvgSize (1<<(3+Log 2 (Max (Ceil(PicHeightInLumaSamples 1080), Ceil(PicHeightInLumaSamples 1920)))))

If fg_model_id is equal to 0, the following applies:

The top-left sample location (xB, yB) of the current blockAvgSize×blockAvgSize block b that contains the sample value $I_{decoded}[c][x][y]$ is derived as (xB, yB)=(x/blockAvgSize, y/blockAvgSize).

The average value $b_{avg}$ of the current blockAvgSize× blockAvgSize block b is derived as follows:

```
sumBlock = 0
avgRatio = Log2(blockAvgSize / 8)
for( i = 0; i < blockAvgSize; i++ )
    for( j = 0; j < blockAvgSize; j++ )
        sumBlock += I_decoded[ c ][ xB * blockAvgSize + i ][yB * blockAvgSize + j ]    (2)
bavg = Clip3( 0, 255,
( sumBlock + ( 1 << ( fgBitDepth[ c ] + 2*avgRatio − 3 ) ) ) >> ( fgBitDepth[ c ] +
2*avgRatio − 2 ) )
```

The value of intensityIntervalIdx[c][x][y][j] is derived as follows:

```
for( i= 0, j = 0; i <= fg_num_intensity_intervals_minus1 [ c ]; i++)
    if( b_avg >= fg_intensity_interval_lower_bound[ c ][ i ] &&
        b_avg <= fg_intensity_interval_upper bound[ c ][ i ] ) {
        intensity IntervalIdx[ c ][ x ][ y ][ j ] = i            (3)
        j++
    }
num ApplicableIntensity Intervals[ c ][ x ][ y ] = j "
```

Appendix 3

1.1.3 Example Embodiment for a bit-accurate process for grain blending

The bit-accurate grain blending process and constraints are specified such that all decoders that conform to this version of this Specification will produce numerically identical cropped decoded output pictures.

Bitstreams conforming to the bit-accurate grain generation process shall obey the following constraints:

ChromaFormatIdc shall equal 1

FGC SEI message shall have fg_model_id equal to 0.

FGC SEI message shall have fg_separate_colour_description_present_flag equal to 0.

FGC SEI message shall have fg_blending_mode_id equal to 0.

FGC SEI message shall have fg_log 2_scale_factor in the range 2 to 7, inclusive.

FGC SEI message shall have fg_intensity_interval upper bound[c][i] less than fg_intensity_interval_lower_bound[c][i+1].

FGC SEI message shall have fg_num_model_values_minus1[c] in the range 0.2, inclusive.

FGC SEI message shall have fg_comp_model_value[c][i][0] in the range 0 . . . 255, inclusive.

FGC SEI message shall have fg_comp_model_value[c][i][1] in the range 2 . . . 14, inclusive.

FGC SEI message shall have fg_comp_model_value[c][i][2] in the range 2 . . . 14, inclusive.

Inputs to the process are the decoded picture sample arrays before grain blending $decPicture_L$, $decPicture_{Cb}$, and $decPicture_{Cr}$.

Outputs of this process are modified decoded picture sample array after grain blending $blendPicture_L$, $blendPicture_{Cb}$, and $blendPicture_{Cr}$.

The variable BlockSize is derived as follows:

BlockSize = Min(1 << (3 + Ceil( Log2 (Max( Ceil( PicHeightInLumaSamples ÷ 1080 ),
Ceil( PicWidthInLumaSamples ÷ 1920) ) ) ), 32)

The grain blending process is derived as the following ordered steps:

The grain pattern database generation is invoked in clause 1.1.3.1. The output is a 13×13×64×64 array GrainDb.

The grain blending process as specified in clause 1.1.3.2 is invoked with decPicture$_L$, decPicture$_{Cb}$, and decPicture$_{Cr}$ as the input, and the output is blendPicture$_L$, blendPicture$_{Cb}$, and blendPicture$_{Cr}$.

1.1.3.1 Grain Pattern Database Generation

Output of this process is a 13×13×64×64 grain pattern database array GrainDb.

The function Prng(x), with x=0 ... 2^(32)-1, is defined as follows:

$$Prng(x)=(x<<1)+(1+((x\ \&(1<<2))>0)+((x\ \&(1<<30))>0))\%\ 2$$

The pseudo-random number generator array SeedLUT[i] with i=0 ... 255 is specified as follows:

```
SeedLUT[i] =
{
  747538460 2023850500 1115949072 135274561 541098240 1669598224
67112961 809550080
  1088979410 76561770 1631803309 355958469 1468005469 1337918685
1005669825 991480851
  1744950180 1226763489 98284748 248291472 456510673 1219264706
903663673 1816248997
  1767011913 80325252 287433856 2127839491 1578687785 1799741108
1771104465 1561503561
  1403382928 1992581442 2119719977 146920100 1838217424 1834116681
1277749632 329575568
  521866116 502705249 988742797 585982612 2010752065 683417731
1229754427 780651196
  1060417601 740409860 1827432592 1611702337 2089828354 1120274457
950632997 1659144592
  2110622736 516219202 579378475 696506029 1362717428 1073098457
1979371465 1910793616
  1557184770 557974537 1017745956 1386498192 970073673 1648396544
2074373264 604016641
  105289385 1883843076 1309377032 1258072451 854129835 176642749
305357524 1665084765
  585624216 720112066 1316535465 1212240548 714793201 31171789
1049387408 1530186961
  1827676546 1640137737 2074315269 1043171860 1266069081 718317889
1171033360 1870928913
  1191843873 1820967556 1923385360 1217404993 1047060864 1266977808
1686114305 809550081
  1018104344 40667586 209722667 1090770605 1991471829 1400892508
2147468765 2079346113
  1123590530 155354121 1546228260 1386498193 1098097741 549749008
1941195985 71307521
  663361569 1820967557 168102420 169093201 913883585 1808010512
117709841 876663040
  2023850500 1115949072 135274561 541098240 1669598224 67112961
809550080 1073807360
  76561770 1631803309 355958469 1468005469 1337918685 1005669825
991480851 832356664
  1226763489 98284748 248291472 456510673 1219264706 903663673
1816248997 1573927377
  80325252 287433856 2127839491 1578687785 1799741108 1771104465
1561503561 204073344
  1992581442 2119719977 146920100 1838217424 1834116681 1277749632
329575568 2026918147
  502705249 988742797 585982612 2010752065 683417731 1229754427
780651196 1702476788
  740409860 1827432592 1611702337 2089828354 1120274457 950632997
1659144592 2043881033
  516219202 579378475 696506029 1362717428 1073098457 1979371465
1910793616 57949587
  557974537 1017745956 1386498192 970073673 1648396544 2074373264
604016641 2001393952
  1883843076 1309377032 1258072451 854129835 176642749 305357524
1665084765 1197426649
  720112066 1316535465 1212240548 714793201 31171789 1049387408
1530186961 1186508931
  1640137737 2074315269 1043171860 1266069081 718317889 1171033360
1870928913 332056865
  1820967556 1923385360 1217404993 1047060864 1266977808 1686114305
809550081 950043140
  40667586 209722667 1090770605 1991471829 1400892508 2147468765
2079346113 890043474
  155354121 1546228260 1386498193 1098097741 549749008 1941195985
71307521 349099312
  1820967557 168102420 169093201 913883585 1808010512 117709841
876663040 148914948
```

The Gaussian pseudo-random array gaussianLUT[m], with m=0 . . . 2047 is specified as follows:

```
gaussianLUT[ m ] =
{
  -11 -51 -38 -1 30 12 -105 127 99 51 -36 60 -38 74 68 93
  12 21 42 120 12 112 50 127 -7 -16 19 101 14 -54 5 17
  103 13 -2 -127 77 67 16 -2 88 107 55 -12 127 -2 -74 -51
  -11 -11 75 -108 112 79 -24 41 125 -8 17 -73 16 32 -61 -59
  42 -20 -67 -49 82 -3 -35 87 -26 53 -51 -17 -127 -45 93 71
  -35 -19 52 9 -61 -114 -14 -65 91 38 40 -52 -31 17 -43 77
  12 33 -90 14 -127 -87 -15 -16 0 -34 33 98 -86 -92 14 81
  59 -127 33 127 111 -6 -127 55 63 17 -37 3 -39 59 -26 127
  77 17 -47 122 -52 -5 -55 19 60 -7 126 3 -56 -64 -38 127
  98 -6 21 109 -29 40 -22 91 -14 4 -39 60 46 -67 -126 61
  -87 -105 -3 52 2 58 -55 -81 -23 -91 -118 33 -41 56 -17 33
  3 18 -56 127 -49 -81 -127 -65 113 6 17 -3 75 -102 16 -106
  65 19 49 2 -24 49 -112 -64 -33 63 -30 -2 23 -29 -127 -93
  -78 71 1 7 58 -27 5 35 116 63 0 10 -19 -87 64 0
  45 48 -57 114 -29 -31 -26 -7 14 -15 19 -42 -22 -34 34 0
  56 -10 -42 19 -73 -34 -72 -54 26 39 98 -106 -70 -92 31 75
  -51 -38 -1 30 12 -105 127 99 51 -36 60 -38 74 68 93 -69
  21 42 120 12 112 50 127 -7 -16 19 101 14 -54 5 17 71
  13 -2 -127 77 67 16 -2 88 107 55 -12 127 -2 -74 -51 127
  -11 75 -108 112 79 -24 41 125 -8 17 -73 16 32 -61 -59 -19
  -20 -67 -49 82 -3 -35 87 -26 53 -51 -17 -127 -45 93 71 -111
  -19 5 9 -61 -114 -14 -65 91 38 40 -52 -31 17 -43 77 30
  33 -90 14 -127 -87 -15 -16 0 -34 33 98 -86 -92 14 81 23
  -127 33 127 111 -6 -127 55 63 17 -37 3 -39 59 -26 127 15
  17 -47 122 -52 -5 -55 19 60 -7 126 3 -56 -64 -38 127 2
  -6 21 109 -29 40 -22 91 -14 4 -39 60 46 -67 -126 61 39
  -105 -3 52 2 58 -55 -81 -23 -91 -118 33 -41 56 -17 33 92
  18 -56 127 -49 -81 -127 -65 113 6 17 -3 75 -102 16 -106 5
  19 49 2 -24 49 -112 -64 -33 63 -30 -2 23 -29 -127 -93 42
  71 1 7 58 -27 5 35 116 63 0 10 -19 -87 64 0 2
  48 -57 114 -29 -31 -26 -7 14 -15 19 -42 -22 -34 34 0 -6
  -10 -42 19 -73 -34 -72 -54 26 39 98 -106 -70 -92 31 75 38
  -38 -1 30 12 -105 127 99 51 -36 60 -38 74 68 93 -69 15
  42 120 12 112 50 127 -7 -16 19 101 14 -54 5 17 71 114
  -2 -127 77 67 16 -2 88 107 55 -12 127 -2 -74 -51 127 -30
   75 -108 112 79 -24 41 125 -8 17 -73 16 32 -61 -59 -19 -37
  -67 -49 82 -3 -35 87 -26 53 -51 -17 -127 -45 93 71 -111 50
  52 9 -61 -114 -14 -65 91 38 40 -52 -31 17 -43 77 30 44
  -90 14 -127 -87 -15 -16 0 -34 33 98 -86 -92 14 81 23 106
  33 127 111 -6 -127 55 63 17 -37 3 -39 59 -26 127 15 27
  -47 122 -52 -5 -55 19 60 -7 126 3 -56 -64 -38 127 2 119
  21 109 -29 40 -22 91 -14 4 -39 60 46 -67 -126 61 39 7
  -3 52 2 58 -55 -81 -23 -91 -118 33 -41 56 -17 33 92 -80
  -56 127 -49 -81 -127 -65 113 6 17 -3 75 -102 16 -106 5 25
  49 2 -24 49 -112 -64 -33 63 -30 -2 23 -29 -127 -93 42 -68
  1 7 58 -27 5 35 116 63 0 10 -19 -87 64 0 2 -21
  -57 114 -29 -31 -26 -7 14 -15 19 -42 -22 -34 34 0 -6 92
  -42 19 -73 -34 -72 -54 26 39 98 -106 -70 -92 31 75 38 -11
  -1 30 12 -105 127 99 51 -36 60 -38 74 68 93 -69 15 -1
  120 12 112 50 127 -7 -16 19 101 14 -54 5 17 71 114 18
  -127 77 67 16 -2 88 107 55 -12 127 -2 -74 -51 127 -30 41
  -108 112 79 -24 41 125 -8 17 -73 16 32 -61 -59 -19 -37 -50
  -49 82 -3 -35 87 -26 53 -51 -17 -127 -45 93 71 -111 50 79
  9 -61 -114 -14 -65 91 38 40 -52 -31 17 -43 77 30 44 -127
  14 -127 -87 -15 -16 0 -34 33 98 -86 -92 14 81 23 106 -43
  127 111 -6 -127 55 63 17 -37 3 -39 59 -26 127 15 27 127
  122 -52 -5 -55 19 60 -7 126 3 -56 -64 -38 127 2 119 18
  109 -29 40 -22 91 -14 4 -39 60 46 -67 -126 61 39 7 11
  52 2 58 -55 -81 -23 -91 -118 33 -41 56 -17 33 92 -80 -21
  127 -49 -81 -127 -65 113 6 17 -3 75 -102 16 -106 5 25 32
  2 -24 49 -112 -64 -33 63 -30 -2 23 -29 -127 -93 42 -68 -52
  7 58 -27 5 35 116 63 0 10 -19 -87 64 0 2 -21 27
  114 -29 -31 -26 -7 14 -15 19 -42 -22 -34 34 0 -6 92 -88
  19 -73 -34 -72 -54 26 39 98 -106 -70 -92 31 75 38 -11 -90
  30 12 -105 127 99 51 -36 60 -38 74 68 93 -69 15 -1 -39
  12 112 50 127 -7 -16 19 101 14 -54 5 17 71 114 18 -19
  77 67 16 -2 88 107 55 -12 127 -2 -74 -51 127 -30 41 -10
```

-continued

```
  112 79 -24 41 125 -8 17 -73 16 32 -61 -59 -19 -37 -50 24
  82 -3 -35 87 -26 53 -51 -17 -127 -45 93 71 -111 50 79 -118
  -61 -114 -14 -65 91 38 40 -52 -31 17 -43 77 30 44 -127 72
  -127 -87 -15 -16 0 -34 33 98 -86 -92 14 81 23 106 -43 -24
  111 -6 -127 55 63 17 -37 3 -39 59 -26 127 15 27 127 -44
  -52 -5 -55 19 60 -7 126 3 -56 -64 -38 127 2 119 18 2
  -29 40 -22 91 -14 4 -39 60 46 -67 -126 61 39 7 11 12
  2 58 -55 -81 -23 -91 -118 33 -41 56 -17 33 92 -80 -21 86
  -49 -81 -127 -65 113 6 17 -3 75 -102 16 -106 5 25 32 -107
  -24 49 -112 -64 -33 63 -30 -2 23 -29 -127 -93 42 -68 -52 39
  58 -27 5 35 116 63 0 10 -19 -87 64 0 2 -21 27 -33
  -29 -31 -26 -7 14 -15 19 -42 -22 -34 34 0 -6 92 -88 -127
  -73 -34 -72 -54 26 39 98 -106 -70 -92 31 75 38 -11 -90 47
  12 -105 127 99 51 -36 60 -38 74 68 93 -69 15 -1 -39 51
  112 50 127 -7 -16 19 101 14 -54 5 17 71 114 18 -19 -24
  67 16 -2 88 107 55 -12 127 -2 -74 -51 127 -30 41 -10 -22
  79 -24 41 125 -8 17 -73 16 32 -61 -59 -19 -37 -50 24 46
  -3 -35 87 -26 53 -51 -17 -127 -45 93 71 -111 50 79 -118 0
  -114 -14 -65 91 38 40 -52 -31 17 -43 77 30 44 -127 72 15
  -87 -15 -16 0 -34 33 98 -86 -92 14 81 23 106 -43 -24 -35
  -6 -127 55 63 17 -37 3 -39 59 -26 127 15 27 127 -44 -69
  -5 -55 19 60 -7 126 3 -56 -64 -38 127 2 119 18 2 -2
  40 -22 91 -14 4 -39 60 46 -67 -126 61 39 7 11 12 -74
  58 -55 -81 -23 -91 -118 33 -41 56 -17 33 92 -80 -21 86 24
  -81 -127 -65 113 6 17 -3 75 -102 16 -106 5 25 32 -107 -6
  49 -112 -64 -33 63 -30 -2 23 -29 -127 -93 42 -68 -52 39 0
  -27 5 35 116 63 0 10 -19 -87 64 0 2 -21 27 -33 29
  -31 -26 -7 14 -15 19 -42 -22 -34 34 0 -6 92 -88 -127 -3
  -34 -72 -54 26 39 98 -106 -70 -92 31 75 38 -11 -90 47 45
  -105 127 99 51 -36 60 -38 74 68 93 -69 15 -1 -39 51 32
  50 127 -7 -16 19 101 14 -54 5 17 71 114 18 -19 -24 -32
  16 -2 88 107 55 -12 127 -2 -74 -51 127 -30 41 -10 -22 117
  -24 41 125 -8 17 -73 16 32 -61 -59 -19 -37 -50 24 46 -45
  -35 87 -26 53 -51 -17 -127 -45 93 71 -111 50 79 -118 0 79
  -14 -65 91 38 40 -52 -31 17 -43 77 30 44 -127 72 15 -24
  -15 -16 0 -34 33 98 -86 -92 14 81 23 106 -43 -24 -35 -17
  -127 55 63 17 -37 3 -39 59 -26 127 15 27 127 -44 -69 -109
  -55 19 60 -7 126 3 -56 -64 -38 127 2 119 18 2 -2 -10
  -22 91 -14 4 -39 60 46 -67 -126 61 39 7 11 12 -74 -70
  -55 -81 -23 -91 -118 33 -41 56 -17 33 92 -80 -21 86 24 88
  -127 -65 113 6 17 7 -3 75 -102 16 -106 5 25 32 -107 -6 -48
  -112 -64 -33 63 -30 -2 23 -29 -127 -93 42 -68 -52 39 0 24
  5 35 116 63 0 10 -19 -87 64 0 2 -21 27 -33 29 -91
  -26 -7 14 -15 19 -42 -22 -34 34 0 -6 92 -88 -127 -3 120
  -72 -54 26 39 98 -106 -70 -92 31 75 38 -11 -90 47 45 -37
  127 99 51 -36 60 -38 74 68 93 -69 15 -1 -39 51 32 50
  127 -7 -16 19 101 14 -54 5 17 71 114 18 -19 -24 -32 -127
  -2 88 107 55 -12 127 -2 -74 -51 127 -30 41 -10 -22 117 58
  41 125 -8 17 -73 16 32 -61 -59 -19 -37 -50 24 46 -45 32
  87 -26 53 -51 -17 -127 -45 93 71 -111 50 79 -118 0 79 -82
  -65 91 38 40 -52 -31 17 -43 77 30 44 -127 72 15 -24 -10
  -16 0 -34 33 98 -86 -92 14 81 23 106 -43 -24 -35 -17 -17
  55 63 17 -37 3 -39 59 -26 127 15 27 127 -44 -69 -109 -7
  19 60 -7 126 3 -56 -64 -38 127 2 119 18 2 -2 -10 46
  91 -14 4 -39 60 46 -67 -126 61 39 7 11 12 -74 -70 -127
  -81 -23 -91 -118 33 -41 56 -17 33 92 -80 -21 86 24 88 -15
  -65 113 6 17 -3 75 -102 16 -106 5 25 32 -107 -6 -48 89
  -64 -33 63 -30 -2 23 -29 -127 -93 42 -68 -52 39 0 24 127
  35 116 63 0 10 -19 -87 64 0 2 -21 27 -33 29 -91 17
  -7 14 -15 19 -42 -22 -34 34 0 -6 92 -88 -127 -3 120 98
  -54 26 39 98 -106 -70 -92 31 75 38 -11 -90 47 45 -37 -39
}
```

The variable fgCutFreH[hi] _((h+3) «2)−1, with h=0 . . . 12.

The variable fgCutFreqV[v]=((v+3) «2)−1, with v=0 . . . 12.

The variable fgCoeffs[h][v][i][j] is initially set equal to 0, with h=0 . . . 12, v=0 . . . 12, i=0 . . . 63, j=0 . . . 63, and is derived as follows:

```
for(h = 0; h < 13 , h++ ) {
  for(v = 0; v < 13 , v++ ) {
    prngVal = SeedLUT( h + 13 * v )
    for( i = 0; i <= fgCutFreqH[ h ] ; i++ ) {
      for( j = 0; j <= fgCutFreqV[ v ] ; j++ ) {
```

-continued

```
                for( k = 0; k < 4; k++ )
                    fgCoeffs[ h ][ v ][ i ][ j + k ] = gaussianLUT[ ( prngVal + k ) % 2048 ]
                prngVal = Prng( prngVal)
            }
        }
    }
}
```

For given h, and v, with h=0 . . . 12, v=0 . . . 12, the array GrainDb[h][v][i][j] is derived from fgCoeffs[h][v][i][j] with i=0 . . . 63, j=0 . . . 63, by invoking the transformation process as specified in Rec. ITU-T H.2661 ISO/IEC 23090-3, clause 8.7.4.4, with trType inferred to equal 0. The grain pattern database GrainDb is further refined as follows:

```
GrainDb[ h ][ v ][ i ][ j ] = Clip3( -127, 127 , GrainDb[ h ][ v ][ i ][ j ])              (xx)
deblockFactor[ v ] = { 64, 71, 77, 84, 90, 96, 103, 109, 116, 122, 128, 128, 128 }          (xx)
for( i = 0; i < 64 ; i += BlockSize ) {
    for( j = 0; j < 64 ; j++ ) {
        GrainDb[ h ][ v ][ i ][ j ] = ( GrainDb[ h ][ v ][ i ][ j ] * deblockFactor[ v ] ) >> 7   (xx)
        GrainDb[ h ][ v ][ i + BlockSize - 1 ][ j ] =
            ( GrainDb[ h ][ v ][ i + BlockSize - 1][ j ] * deblockFactor[ v ] ) >> 7
    }
}
```

1.1.3.2 Grain Blending Process

Inputs to this process are the decoded picture prior to grain blending, i.e., the arrays $decPicture_L$, $decPicture_{Cb}$ and $decPicture_{Cr}$.

Outputs of this process are the modified decoded picture after grain blending, i.e., the array $blendPicture_L$, $blendPicture_{Cb}$ and $blendPicture_{Cr}$.

Depending on the value of the colour component cIdx, the following assignment is made:

- If cIdx is equal to 0, decSamples corresponds to the decoded picture sample array $decPicture_L$ and blendSamples corresponds to the blended sample array $blendPicture_L$.
- else if cIdx is equal to 1, decSamples corresponds to the decoded picture sample array $decPicture_{Cb}$ and blendSamples corresponds to the blended sample array $blendPicture_{Cb}$.
- otherwise (cIdx is equal to 2), decSamples corresponds to the decoded picture sample array $decPicture_{Cr}$ and blendSamples corresponds to the blended sample array $blendPicture_{Cr}$.

For given cIdx,

If fg_comp_model_present_flag[cIdx] is equal to 0, blendSamples[i][j]=decSamples[i][j], with i=0 . . . (cIdx==0):PicWidthInLumaSamples: PicWidthInLumaSamples/2, j=0 . . . (cIdx==0):PicWidthInLumaSamples: PicHeightInLumaSamples/2

Otherwise (fg_comp_model_present_flag[cIdx] is not equal to 0), the following applies:

The variable PicWidthInBlockY and PicHeightInBlockY are derived as follows:

```
PicWidthInBlockY = Ceil( PicWidthInLumaSamples ÷ BlockSize )
PicHeightInBlockY = Ceil( PicHeightInLumaSamples ÷ BlockSize )
```

The variable PicWidthInBlockC and PicHeightInBlockC are derived as follows:

```
PicWidthInBlockC = Ceil( PicWidthInLumaSamples ÷ 2 ÷ BlockSize )
PicHeightInBlockC = Ceil( PicHeightInLumaSamples ÷ 2 ÷ BlockSize )
```

For color component index cIdx, with cIdx=0 . . . 2, the variable PicWidthInBlock ad PicHeightInBlock are derived as follows:

```
PicWidthInBlock = ( cIdx == 0) ? PicWidthInBlockY : PicWidthInBlockC
PicHeightInBlock = ( cIdx == 0) ? PicHeightInBlockY : PicHeightInBlockC
```

The seed initialization for current picture is invoked in clause 1.1.3.2.1 with cIdx as inputs, and outputs are array prngArray.

The grain blending process is performed on a block basis. For every block with block location (rx, ry), where rx=0 . . . PicWidthInBlock−1 and ry=0 . . . PicHeightIn Block−1, the grain block blending process is invoked as specified in clause 1.1.3.2.2, with the location (xCurr, yCurr) set equal to (rx*BlockSize, ry*BlockSize), cIdx assigned to cIdx, (xIdx, yIdx) set equal to (rx, ry), the array prngArray and decSamples as inputs, and the outputs are blendSamples.

1.1.3.2.1 Seed Initialization for Current Picture

Input to this process is a variable cIdx specifying the colour component.

The output of this process are picture seed array prngArray.

The function MSB16(x) with x=0 . . . 2^(32)−1, is defined as follows:

$MSB16(x)=((x\&0xFFFF0000)\gg 16)$

The function LSB16(x) with x=0 . . . 2^(32)−1, is defined as follows:

$LSB16(x)=(x\&0x0000FFFF)$

The function BIT0(x) with x=0 . . . 2^(32)−1, is defined as follows:

$BIT0(x)=(x\&0x1)$

The variable picOffset=PicOrderCnt (e.g., PicOrderCnt=PicOrderCntVal)

The variable cOffset=(cIdx==0)? 0: (cIdx==1) ? 85:170)

The variable prngInit=SeedLUT[picOffset+cOffset) % 256]

The array prngArray[i][j] with i=0 . . . PicHeightInBlock−1, j=0 . . . PicWidthInBlock−1 is derived as follows:

```
The variable prngVal = prngInit
bIdc = ((BlockSize == 8) ? 2 : 1
for( i = 0; i < PicHeightInBlock/bIdc ; i ++ ) {
    for( j = 0; j < Pic WidthInBlock/bIdc; j ++ ) {
        if (bIdc == 2) {
            prngArray [2*i] [2*j] = prng Val
            prngArray [2*i][2*j+1] = prng Val
            prngArray [2*i+1][2*j] = prng Val
            prngArray [2*i+1][2*j+1] = prng Val
        }else
            prngArray[i][j] = prng Val
        prng Val = Prng(prngVal)
    }
}
```

1.1.3.2.2 Grain Block Blending Process

Inputs to this process are:
- a location (xCurr, yCurr) specifying the top-left sample of the current block relative to the top-left sample of the current picture component,
- a variable cIdx specifying the colour component of the current block,
- a block index (xIdx, yIdx) specifying the block index of the current block,
- a picture seed array prngArray,
- a decoded sample array decSamples Outputs to this process are blended sample array blendSamples.

The variable picWidth=(cIdx==0)? PicWidthInLumaSamples: PicWidthInLumaSamples/2

The variable picHeight=(cIdx==0)? PicHeightInLumaSamples: PicHeightInLumaSamples/2

The variable intensityIntevalIdx for the current block is initialized to be −1 and is derivded as follows:

```
sumBlock = 0
avgRatio = Log2(BlockSize / 8)
for( i = 0; i < BlockSize ; i++ )
    for( j = 0; j < BlockSize ; j++ )
        sumBlock += decSamples [Min(picWidth − 1, xCurr + i )][Min( picHeight − 1, yCurr + j )]                         (xx)
b_avg = Clip3( 0, 255,
( sumBlock + ( 1 << ( fgBitDepth[ cIdx ] + 2 * avgRatio − 3))) >> ( fgBitDepth[ cIdx ] + 2
* avgRatio − 2 ) )
for( i= 0; i <= fg_num_intensity_intervals_minus1[ cIdx ]; i++ )
    if( b_avg >= fg_intensity_interval_lower_bound[ cIdx ][ i ] &&
        b_avg <= fg_intensity_interval_upper_bound[ cIdx ][ i ] ) {
        intensity IntervalIdx = i                                    (xx)
        break
    }
```

The derivation of decSamples for the current block is as follows:

- If intensity IntervalIdx == − 1, blendSamples[ xCurr+ i ][ yCurr+ j ] = decSamples[ xCurr+ i ][ yCurr+ j ], with i=0..Min(pic Width − xCurr − 1, BlockSize −1), j=0.. Min(picHeight − yCurr − 1, BlockSize −1;

Otherwise (intensityIntervalIdx !=−1), the following applies:

- The variable scaleFactor = fg_comp_model_value[ cIdx ][ intensityIntervalIdx ][ 0 ] *
( 1 − 2 * BIT0(prngArray[yIdx][xIdx])

The variable hFreq is derived as follows:

```
hFreq = fg_comp_model_value[ cIdx ][ intensity IntervalIdx ][ 1 ]
hFeq = (cIdx == 0) ? hFreq : Clip3(2, 14, (hFreq << 1))
hFeq = hFreq - 2
```

The variable vFreq is derived as follows:

```
vFreq = fg_comp_model_value[ cIdx ][ intensityIntervalIdx ][ 2 ]
vFeq = (cIdx == 0) ? vFreq : Clip3(2, 14, (vFreq << 1))
vFeq = vFreq - 2
```

The variable horzDenom=(BlockSize==32)? 36: 52
The variable vertDenom=(BlockSize==32)? 40: 56
The variable horzOffset is derived as follows:

```
horzOffset = MSB16(prngArray [yIdx][xIdx]% horzDenom)
horzOffset &= 0xFFFC
horzOffset += ( BlockSize == 8 )? (xIdx & 0x0008) : 0
```

The variable vertOffset is derived as follows:

```
vertOffset = LSB16(prngArray[yIdx][xIdx]% vertDenom)
vertOffset &= 0xFFF8
vertOffset += ( BlockSize == 8 )? (yIdx & 0x0008) : 0
```

The array grainSamples is derived as follows:

```
grainSamples[xCurr + i ][ yCurr + j ] =
    ( scaleFactor * grainDb[hFreq ][ vFreq ][ i + horzOffset] [ j + vertOffset] ) >> ( fg_log2_scale_factor + 6 )
    with i=0..Min(pic Width - xCurr - 1, BlockSize -1), j=0..Min(picHeight - yCurr - 1, BlockSize -1)
```

The grainSample is further refined as follows:

```
-   if xCurr > 0, the following applies:
        for( k = 0; k < BlockSize; k++ ) {
            l1 = grainSamples[xCurr - 2][k]
            l0 = grainSamples[xCurr - 1][k]
            r0 = grainSample[xCurr][k]
            r1 = grainSample[xCurr+1][k]
            grainSamples[xCurr][k] = ( (l0 + (r0 << 1 ) + r1 ) >> 2)
            grain Samples[xCurr - 1][k] = ( (l1 + (l0 << 1 ) + r0 ) >> 2)
```

The array blendSamples is derived as follows:

```
blendSample[xCurr+i][yCurr+j] = Clip3( 0, (1 << fgBitDepth[ cIdx ] ) - 1,
decodedSamples[xCurr+i][yCurr+j] + grainSamples[xCurr+i] [yCurr+j] )
with i=0..Min(pic Width - xCurr - 1, BlockSize -1), j=0..Min(picHeight - yCurr - 1, BlockSize -1)
```

What is claimed is:

1. A method to process film grain metadata, the method comprising:
receiving an input video bitstream and associated input film grain information according to a first video coding standard;
parsing the input film grain information to generate input film grain parameters for film grain synthesis according to a film grain parameter set of the first video coding standard;
generating output film grain parameters for noise synthesis according to a film grain parameter set of a second video coding standard by transcoding the input film grain parameters, wherein the second video coding standard is different than the first video coding standard;
generating output film noise by using noise synthesis according to the second video standard based on the output film grain parameters;

decoding the input video bitstream according to the first video coding standard to generate decoded video pictures; and adding the output film noise to the decoded video pictures to generate output video pictures;

wherein the input film grain information is received in an MPEG SEI message that comprises AV1 film grain parameters and the output film grain parameters according to the MPEG video coding standard are generated only if a flag is established indicating a fulfilling of constraints.

2. The method of claim 1, wherein the first video coding standard comprises a variant of the MPEG video coding standard, and the second video coding standard comprises a variant of the AV1 video coding standard.

3. The method of claim 1, wherein the first video coding standard comprises a variant of the AV1 video coding standard and the second video coding standard comprises a variant of the MPEG video coding standard.

4. The method of claim 2, wherein the input film grain information comprises film grain information received in an MPEG supplemental enhancement information (SEI) message and the output film grain parameters are generated only when constraints are fulfilled, wherein the constraints comprise input film grain parameters indicating that noise synthesis is generated in an AV1 film grain synthesis process using an autoregressive model with an additive blending mode.

5. The method of claim 4, wherein the input film grain parameters indicate that the input video bitstream is progressive video in monochrome or 4:2:0 YUV format.

6. The method of claim 4, wherein for a sequence of intensity intervals, the received MPEG SEI message comprises first film grain parameters fg_intensity_interval_upper_bound[c][i] and fg_intensity_interval_lower_bound[c][i], wherein [c] denotes a color component and [i] denotes the i-th intensity interval;

wherein the constraints further comprise:

if fg_intensity_interval_upper_bound[0][i] is equal to fg_intensity_interval_lower_bound[0][i+1]−1, then:

generating the output film grain parameters according to the AV1 video coding standard by using syntax values contained in the MPEG SEI message, wherein c=0 refers to the luma component.

7. The method of claim 4, wherein a previously received MPEG SEI message comprises input film grain parameter fg_characteristics_persistence_flag; wherein the constraints further comprise, for a current picture in the input video bitstream:

if there is no input film grain information, then:

if fg_characteristics_persistence_flag is set to 1, then:

generating the output film grain parameters according to the AV1 video coding standard by using syntax values contained in the previously received MPEG SEI message, else:

not generating output film grain parameters.

8. The method of claim 7, wherein the received MPEG SEI message comprises input film grain parameter fg_characteristics_cancel_flag;

wherein the constraints further comprise, for a current picture in the input video bitstream:

if there is input film grain information, then:

if fg_characteristics_cancel_flag is equal to 0, then:

generating the output film grain parameters according to the AV1 video coding standard by using syntax values contained in the MPEG SEI message, else:

not generating output film grain parameters.

9. The method of claim 1, wherein generating the output film grain parameters according to the MPEG video coding standard further comprises:

if the flag is established and AV1 film grain parameters are received in the MPEG SEI message, then:

fg_characteristics_cancel_flag=0, fg_model_id=1, fg_separate_colour_description_present_flag=0, and fg_blending_mode_id=0, wherein fg_characteristics_cancel_flag, fg_model_id, fg_separate_colour_description_present_flag, and fg_blending_mode_id denote output film grain parameters according to the MPEG video coding standard.

10. A non-transitory computer-readable storage medium having stored thereon computer-executable instructions for executing with one or more processors a method in accordance with claim 1.

11. An apparatus comprising a processor and configured to perform a method in accordance with claim 1.

* * * * *